(12) United States Patent
Hiraguchi

(10) Patent No.: US 7,104,486 B2
(45) Date of Patent: Sep. 12, 2006

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 61 days.

(21) Appl. No.: 10/746,552

(22) Filed: Dec. 29, 2003

(65) Prior Publication Data

US 2005/0145736 A1 Jul. 7, 2005

(51) Int. Cl.
*G11B 23/07* (2006.01)

(52) U.S. Cl. ............... 242/338.1; 242/348; 360/132

(58) Field of Classification Search ........... 242/338.1, 242/343, 348; 360/132
See application file for complete search history.

(56) References Cited

U.S. PATENT DOCUMENTS

| 3,066,880 | A | * | 12/1962 | Bauer | 242/338.1 |
|---|---|---|---|---|---|
| 5,436,782 | A | * | 7/1995 | Sieben | 360/132 |
| 5,547,142 | A | * | 8/1996 | Cheatham et al. | 242/338.1 |
| 6,273,352 | B1 | | 8/2001 | Johnson et al. | |
| 6,273,354 | B1 | | 8/2001 | Kovacik | |
| 6,315,230 | B1 | | 11/2001 | Hansen et al. | |
| 6,452,747 | B1 | * | 9/2002 | Johnson et al. | 360/132 |
| 6,499,686 | B1 | * | 12/2002 | Tsuyuki et al. | 242/348 |
| 6,728,066 | B1 | * | 4/2004 | Morita et al. | 360/132 |
| 6,814,326 | B1 | * | 11/2004 | Tsuyuki et al. | 242/348 |
| 2003/0001038 | A1 | * | 1/2003 | Hiraguchi et al. | 242/348 |

FOREIGN PATENT DOCUMENTS

JP 11-53862 A 2/1999

* cited by examiner

*Primary Examiner*—William A. Rivera
(74) *Attorney, Agent, or Firm*—Sughrue Mion, PLLC

(57) ABSTRACT

A recording tape cartridge has a reel at whose axially central portion is provided a reel hub which is shaped as a cylindrical tube having a bottom and around whose outer peripheral surface a recording tape is wound; an engaging gear provided within the reel hub; a case rotatably accommodating the reel; and a braking member having a braking gear which can mesh with the engaging gear. The engaging gear is formed in a form of internal teeth or in a form of external teeth. A tooth surface of each tooth is substantially parallel to an axis of the reel hub. The braking member is supported so as to be unable to rotate with respect to the case, and moves along an axis of the reel, and can be disposed at a rotation locking position, at which the braking gear meshes with the engaging gear, and a released position at which meshing is released.

20 Claims, 11 Drawing Sheets

RECORDING TAPE CARTRIDGE

BACKGROUND OF THE INVENTION

1. Field of the Invention

The present invention relates to a reel on which a recording tape, such as a magnetic tape or the like, is wound, and to a recording tape cartridge which rotatably accommodates the reel within a case.

2. Description of the Related Art

Recording tapes such as magnetic tapes and the like are used as external recording media for computers and the like. Little space is required to accommodate such a recording tape at the time of storage thereof, and a large amount of information can be recorded thereon. A so-called single-reel recording tape cartridge is used in which a single reel, on which the recording tape is wound, is rotatably accommodated within a case.

A reel which is made of resin and which structures such a recording tape cartridge will be described by using FIG. 10. The axially central portion of a reel 200 shown in FIG. 10 is structured by a reel hub 202. The reel hub 202 is formed in the shape of a cylindrical tube having a bottom, and a magnetic tape is wound around the outer peripheral surface thereof. The reel hub 202 has an engaging gear 206 which stands at the inner surface of a floor plate portion 204 of the reel hub 202, and a reel gear 208 which stands at the outer surface of the floor plate portion 204.

The engaging gear 206 is formed by a large number of teeth, whose addenda are directed upward, the teeth being disposed along a circumference which is coaxial with the reel hub 202, and is provided on a pedestal portion 210 which stands erect at the floor plate portion 204. When the magnetic tape is not being used, the engaging gear 206 meshes with a braking gear which is formed at the bottom surface of a braking member, so as to impede rotation of the reel 200. The respective teeth of the engaging gear 206 are formed in tapered shapes which guide the braking gear in. The engaging gear 206 centers the braking member by meshing with the braking gear which is adjacent thereto along the axial direction of the reel hub.

Because the respective teeth of the engaging gear 206 are formed in tapered shapes, there is the concern that the reel 200 will rotate merely due to the braking member moving slightly from the locked state of the reel 200 in the direction in which locking is released.

On the other hand, the reel gear 208 is formed by a large number of teeth, whose addenda are directed downward, the teeth being disposed along the outer peripheral portion of the floor plate portion 204. The radial direction inner side end portions of the respective teeth are connected by a rib 212. A reel plate 214, which is formed of a magnetic material, is attached to the inner side of the rib 212 at the outer surface of the floor plate portion 204. The reel plate 214 is attracted by a magnet provided at the rotating shaft of a drive device. When the magnetic tape is used, a driving gear of the aforementioned rotating shaft meshes reel gear 208 in a state in which the reel plate is attracted to and held by the magnet. Due to the rotating shaft rotating in this state, the reel 200 is driven to rotate.

However, at the reel 200, as shown in FIG. 11, the engaging gear 206 is formed on the pedestal portion 210, and the rib 212 projects from the reverse side of this pedestal portion 210. Therefore, a thickness t4 of the floor plate portion 204 of the reel hub from the top surface of the pedestal portion 210 (the engaging gear 206) to the bottom surface of the rib 212 is large. Moreover, at the radial direction inner side of the portion where the thickness is t4, a portion having a thickness t5 from the pedestal portion 210 to the bottom surface of the floor plate portion 204, and a portion having a thickness t6 which is the thickness of the floor plate portion 204 itself, are formed continuously in that order. Namely, this is a structure in which the thickness changes in steps. The flowability of the resin at the time of molding the reel 200 is therefore poor.

Moreover, at the reel 200, the surfaces of the reel gear 208 which mesh with the driving gear are inclined surfaces which are inclined with respect to the axial direction. The positioning of the reel 200 in the axial direction with respect to the rotating shaft is carried out by the reel gear 208 and the driving gear meshing together such that no backlash arises. Namely, the axial direction reference surface at the time when the reel 200 is driven to rotate is an imaginary surface which is the meshing pitch surface of the reel gear 208 with the driving gear. In this way, because the dimensions of the respective portions of the reel 200 are determined on the basis of an imaginary reference surface, evaluation of the dimensions of the respective portions, and designing, have been complicated.

Thus, as disclosed in U.S. Pat. No. 6,273,354 for example, the following structure has been conceived of in which: three convex portions for reference project at uniform intervals in the peripheral direction from the outer surface of the floor plate portion of the reel hub, at the radial direction outer side of the reel gear; end surfaces of the respective convex portions for reference, which are surfaces orthogonal to the axis of the reel, are used as reference surfaces; and positioning of the reel in the axial direction is carried out by these reference surfaces being made to abut positioning surfaces of the rotating shaft.

However, even in a structure in which such reference surfaces are provided independently of the reel gear, there is room for improvement.

SUMMARY OF THE INVENTION

In view of the aforementioned, a first object of the present invention is to provide a recording tape cartridge structured such that it is difficult for meshing of a braking gear of a braking member and an engaging gear of a reel to inadvertently be released. Further, a second object of the present invention is to provide a recording tape cartridge which, by utilizing the aforementioned structure, enables a floor plate portion of a reel hub to be made to be thin or to be made to have a uniform thickness.

A recording tape cartridge relating to a first aspect of the present invention comprises: a reel having a reel hub provided at an axially central portion of the reel, the reel hub having a cylindrical portion around whose outer peripheral surface a recording tape is wound and a floor plate portion closing one end portion of the cylindrical portion; an engaging gear which is formed in one of a form of internal teeth and a form of external teeth and at which a plurality of teeth provided in the reel hub are disposed along a circumference which is coaxial to the reel hub, a tooth surface of each of the teeth being substantially parallel to an axis of the reel hub; a case rotatably accommodating the reel; and a braking member having a braking gear which is formed in one of a form of external teeth and a form of internal teeth and which can mesh with the engaging gear, the braking member being supported so as to be unable to rotate within the case with respect to the case and so as to be movable along an axis of the reel, and, by moving, the braking member can be selectively disposed at a rotation locking position, at which the braking gear is meshed with the engaging gear, and a released position, at which meshing of the braking gear and the engaging gear is released.

In the above-described recording tape cartridge, when the braking member, which cannot rotate with respect to the case, is positioned at the rotation locking position, the braking gear meshes with the engaging gear, and rotation of the reel with respect to the case is impeded. On the other hand, when the braking member is positioned at the released position, meshing of the braking gear and the engaging gear is cancelled, and rotation of the reel with respect to the case is permitted.

Here, the engaging gear is formed in the form of internal teeth or in the form of external teeth in which the tooth surface of each tooth is substantially parallel to the axis of the reel. The braking gear is formed in the form of external teeth or in the form of internal teeth corresponding to the engaging gear. Therefore, the magnitude of the gap (i.e., the backlash) in the peripheral direction between the braking gear and the engaging gear does not vary in accordance with movement of the braking member in the axial direction of the reel. Accordingly, even if the position of the braking member becomes offset from the rotation locking position toward the released position, inadvertent rotation of the reel is impeded. Moreover, even if an attempt is made to forcibly rotate the reel which is in the rotation locked state, no portion of this torque is converted, by the meshed-together surfaces of the braking gear and the engaging gear, into moving force which moves the braking member toward the released position, and inadvertent rotation of the reel is reliably impeded.

As described above, in the recording tape cartridge relating to the first aspect, it is difficult for the meshing between the braking gear of the braking member and the engaging gear of the reel to inadvertently be released.

In the first aspect, a stopper may be provided at one of the braking member and the floor plate portion of the reel hub, the stopper abutting another of the braking member and the floor plate portion of the reel hub in a state in which the braking gear is apart from the floor plate portion of the reel hub when the braking member is positioned at the rotation locking position.

In the above-described recording tape cartridge, when the stopper abuts the floor plate portion of the reel hub or the braking member, the braking member going past the rotation locking position and moving toward the floor plate portion of the reel hub is impeded. At this time, the braking gear is apart from the floor plate portion and meshes with the engaging gear. Accordingly, the position, in the axial direction of the reel, at which the braking gear and the engaging gear mesh together can be set in accordance with the height of the stopper, and the degrees of freedom in design can be increased. Note that the stopper may be provided both at the braking member and at the floor plate portion of the reel hub.

A recording tape cartridge relating to a second aspect of the present invention comprises: a reel having a reel hub provided at an axially central portion of the reel, the reel hub having a cylindrical portion around whose outer peripheral surface a recording tape is wound and a floor plate portion closing one end portion of the cylindrical portion; an engaging gear which is formed in one of a form of internal teeth and a form of external teeth and at which a plurality of teeth standing erect from an inner surface of the floor plate portion of the reel hub are disposed on a circumference which is coaxial to the reel hub, a tooth surface of each of the teeth being substantially parallel to an axis of the reel hub; a reference convex portion projecting from the floor plate portion of the reel hub at a reverse surface of a region where the engaging gear stands erect, a positioning surface of a drive device abutting an end surface of the reference convex portion; a case rotatably accommodating the reel while exposing the reference convex portion of the reel to an exterior; and a braking member having a braking gear which is formed in one of a form of external teeth and a form of internal teeth and which can mesh with the engaging gear, the braking member being supported so as to be unable to rotate within the case with respect to the case and so as to be movable along an axis of the reel, and, by moving, the braking member can be selectively disposed at a rotation locking position, at which the braking gear is meshed with the engaging gear, and a released position, at which meshing of the braking gear and the engaging gear is released.

In the above-described recording tape cartridge, when the braking member, which cannot rotate with respect to the case, is positioned at the rotation locking position, the braking gear meshes with the engaging gear, and rotation of the reel with respect to the case is impeded. On the other hand, when the braking member is positioned at the released position, meshing of the braking gear and the engaging gear is cancelled, and rotation of the reel with respect to the case is permitted. Further, when the positioning surface of the drive device abuts the end surface of the reference convex portion, the axial direction position of the reel with respect to the drive device is determined. In this positioned state, the reel is driven to rotate while, for example, being chucked by a chucking device of the drive device.

Here, the engaging gear is formed in the form of internal teeth or in the form of external teeth at which the tooth surface of each tooth is substantially parallel to the axis of the reel, and the braking gear is formed in the form of external teeth or in the form of internal teeth corresponding to the engaging gear. Therefore, the backlash in the peripheral direction between the braking gear and the engaging gear does not vary in accordance with movement of the braking member in the axial direction of the reel. Accordingly, even if the position of the braking member becomes offset from the rotation locking position toward the released position, inadvertent rotation of the reel is impeded. Moreover, even if an attempt is made to forcibly rotate the reel which is in the rotation locked state, no portion of this torque is converted, by the meshed-together surfaces of the braking gear and the engaging gear, into moving force which moves the braking member toward the released position, and inadvertent rotation of the reel is reliably impeded.

Moreover, the reference convex portion projects from the floor plate portion of the reel hub from the reverse surface side of the region where the engaging gear stands erect. However, the engaging gear is formed in the form of internal teeth or external teeth. Therefore, the tooth groove portions of the engaging gear prevent the region of the floor plate portion where the reference convex portion projects from becoming thick. In this way, the moldability when the reel is formed by resin molding is improved.

As described above, in the recording tape cartridge relating to the second aspect, it is difficult for the meshing between the braking gear of the braking member and the engaging gear of the reel to inadvertently be released. Moreover, due to this recording tape cartridge being provided with the engaging gear which has the above-described structure, the floor plate portion of the reel hub can be made to be thin, even in a structure provided with the reference convex portion.

Further, the second aspect may be structured such that a first conical surface around the axis of the reel hub is formed at an outer surface of the floor plate portion of the reel hub, and an annular reel gear, with which a driving gear of a drive device can mesh, projects from the first conical surface, and a region where the engaging gear stands erect at an inner surface of the floor plate portion of the reel hub is a second conical surface which is inclined toward a same side as the first conical surface and which overlaps the first conical surface in a direction orthogonal to a direction of inclination.

In the above-described recording tape cartridge, in the state in which the driving gear of the drive device is meshed with the reel gear which is provided at the outer surface of the floor plate portion of the reel hub, the reel is driven to rotate due to the driving gear rotating. The surface from which the engaging gear projects at the inner surface of the floor plate portion is a second conical surface around the axis of the reel. This second conical surface is inclined toward the same side as a first conical surface from which the reel gear projects at the outer surface of the floor plate portion. Further, the second conical surface overlaps the first conical surface in a direction orthogonal to this direction of inclination (portions restricting the thickness of the floor plate portion exists at the second conical surface and the first conical surface). Therefore, the thicknesses of the regions of the floor plate portion where the engaging gear and the reel gear project do not vary in a step-like manner. Namely, the thicknesses of the floor plate portion at the regions where the engaging gear and the reel gear project either vary continuously or are substantially uniform. Namely, the floor plate portion is made to be a uniform thickness. In this way, the moldability when the reel is formed by resin molding is improved even more.

In the second aspect, in the structure having the above-described second conical surface, a stopper may be provided at one of the braking member and the floor plate portion of the reel hub, the stopper abutting another of the braking member and the floor plate portion of the reel hub in a state in which the braking gear is apart from the floor plate portion of the reel hub when the braking member is positioned at the rotation locking position.

In the above-described recording tape cartridge, when the stopper abuts the floor plate portion of the reel hub or the braking member, the braking member going past the rotation locking position and moving toward the floor plate portion of the reel hub is impeded. At this time, the braking gear is apart from the floor plate portion and meshes with the engaging gear. Namely, the braking member is prevented from contacting the second conical surface. Note that the stopper may be provided both at the braking member and at the floor plate portion of the reel hub.

A recording tape cartridge relating to a third aspect of the present invention comprises: a reel having a reel hub provided at an axially central portion of the reel, the reel hub having a cylindrical portion around whose outer peripheral surface a recording tape is wound and a floor plate portion closing one end portion of the cylindrical portion; a reel gear projecting along the outer peripheral surface of the cylindrical portion of the reel hub from an outer surface of the floor plate portion of the reel hub, the reel gear being formed in an annular form and being able to mesh with a drive gear of a drive device; an engaging gear which is an internal spur gear at which an inner surface of the cylindrical portion of the reel hub is teeth bottom surfaces and at which one end portion, in a widthwise direction of teeth, is continuous with the floor plate portion of the reel hub; a case rotatably accommodating the reel while exposing the reel gear to an exterior; and a braking member having a braking gear which is formed in a form of external teeth and which can mesh with the engaging gear, the braking member being supported so as to be unable to rotate within the case with respect to the case and so as to be movable along an axis of the reel, and, by moving, the braking member can be selectively disposed at a rotation locking position, at which the braking gear is meshed with the engaging gear, and a released position, at which meshing of the braking gear and the engaging gear is released.

In the above-described recording tape cartridge, when the braking member, which cannot rotate with respect to the case, is positioned at the rotation locking position, the braking gear meshes with the engaging gear, and rotation of the reel with respect to the case is impeded. On the other hand, when the braking member is positioned at the released position, meshing of the braking gear and the engaging gear is cancelled, and rotation of the reel with respect to the case is permitted. In the state in which the driving gear of the drive device meshes with the reel gear, the reel is driven to rotate due to the driving gear rotating.

Here, the engaging gear is an internal spur gear. In other words, the tooth surfaces of the teeth structuring the engaging gear and the teeth structuring the braking gear are substantially parallel to the axis of the reel hub. Therefore, the backlash in the peripheral direction between the braking gear and the engaging gear does not vary in accordance with movement of the braking member in the axial direction of the reel. Accordingly, even if the position of the braking member becomes offset from the rotation locking position toward the released position, inadvertent rotation of the reel is impeded. Moreover, even if an attempt is made to forcibly rotate the reel which is in the rotation locked state, no portion of this torque is converted, by the meshed-together surfaces of the braking gear and the engaging gear, into moving force which moves the braking member toward the released position, and inadvertent rotation of the reel is reliably impeded.

Moreover, the reel gear projects from the outer surface of the floor plate portion of the reel hub, and one end portion, in the widthwise direction of the tooth, of each tooth structuring the engaging gear is integral with the inner surface of the floor plate portion. In other words, the reel gear and the engaging gear project or stand erect directly from the outer surface and the inner surface of the floor plate portion, respectively. Therefore, the reel gear and the engaging gear do not affect the thickness of the floor plate portion. Accordingly, it is possible to make the floor plate portion of the reel hub be a uniform thickness, and the moldability when the reel is formed by resin molding is improved.

As described above, in the recording tape cartridge relating to the third aspect, it is difficult for the meshing between the braking gear of the braking member and the engaging gear of the reel to inadvertently be released. Moreover, by providing this recording tape cartridge with the engaging gear which has the above-described structure, the floor plate portion of the reel hub can be made to be a uniform thickness.

The third aspect may be structured such that a region at the floor plate portion of the reel hub at which region the reel gear projects is a first conical surface whose axis coincides with an axis of the reel hub, and a surface of the floor plate portion with which surface the engaging gear is continuous is a second conical surface which is inclined in a same direction as the first conical surface and whose axis coincides with the axis of the first conical surface.

In the above-described recording tape cartridge, the first conical surface, which is the border portion between the reel gear and the outer surface of the floor plate portion of the reel hub, and the second conical surface, which is the border portion between the engaging gear and the inner surface of the floor plate portion, are inclined in the same direction. Namely, at the reel hub, the corner portions of the cylindrical portions at the floor plate portion are formed in substantially conical shapes. The flowability of the resin between the cylindrical portion and the floor plate portion in a case in which the reel is formed by resin molded is good, and the moldability improves further.

Further, the third aspect may be structured such that an inner diameter of the reel gear is smaller than an inner diameter of the engaging gear, and a reference convex portion, whose end surface abuts a positioning surface of the drive device, projects from the floor plate portion at a reverse side of the second conical surface.

In the above-described recording tape cartridge, the positioning of the reel in the axial direction with respect to the drive device is carried out due to the positioning surface of the drive device abutting the end surface of the reference convex portion. The reference convex portion is formed to project from the floor plate portion of the reel hub at the reverse surface side of the region where the engaging gear stands erect. However, the engaging gear is an internal spur gear. Therefore, the tooth groove portions of the engaging gear prevent the region of the floor plate portion where the reference convex portion projects from becoming thick. In this way, the moldability in a case in which the reel is formed by resin molding improves.

DETAILED DESCRIPTION OF THE INVENTION

A recording tape cartridge 10 relating to an embodiment of the present invention will be described on the basis of FIGS. 1 through 7. Note that arrow A used appropriately in the respective drawings indicates the direction of loading the recording tape cartridge 10 into a drive device, and for convenience of explanation, the side in the direction of arrow A is shown as the front side. Further, the direction indicated by arrow B is upward.

(Overall Structure of Recording Tape Cartridge)

Figure 1:
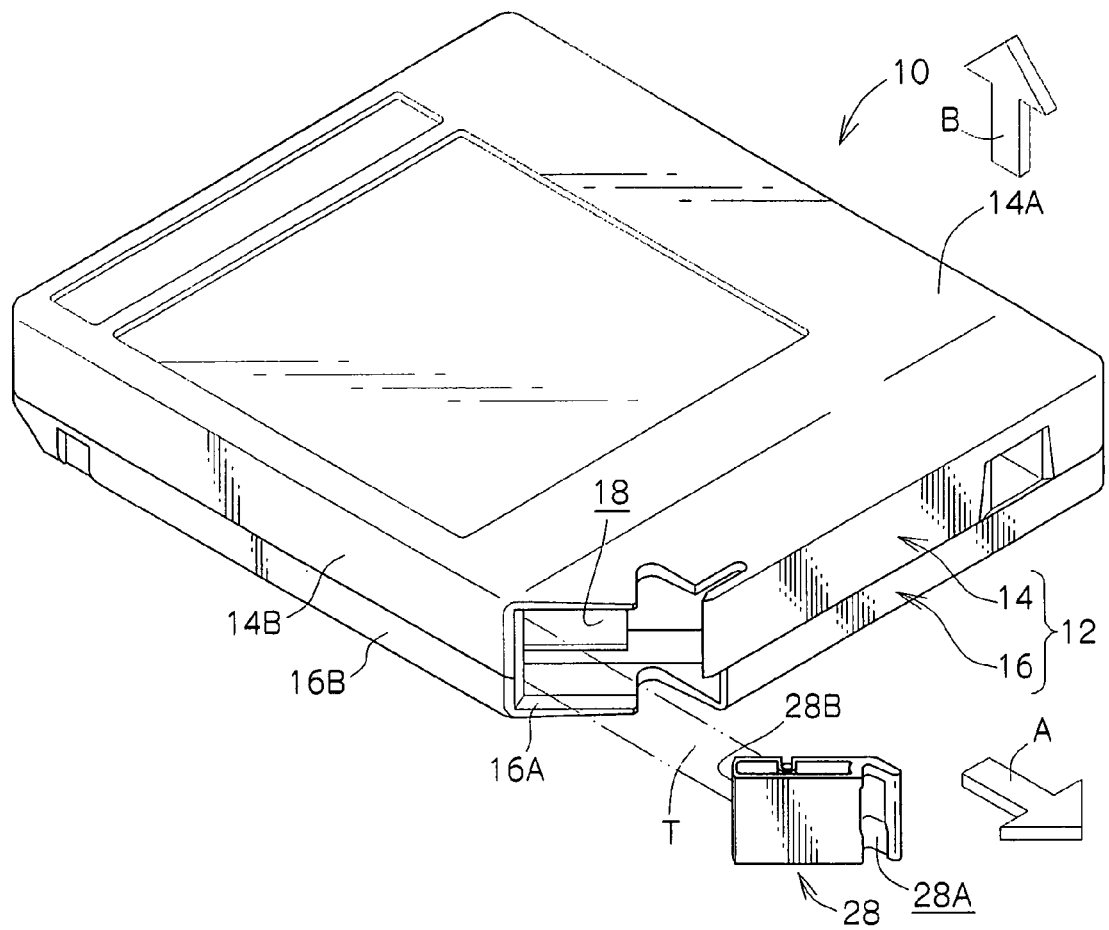
FIG. 1 is a perspective view, as seen from above, illustrating the external appearance of a recording tape cartridge relating to an embodiment of the present invention.
Figure 2:
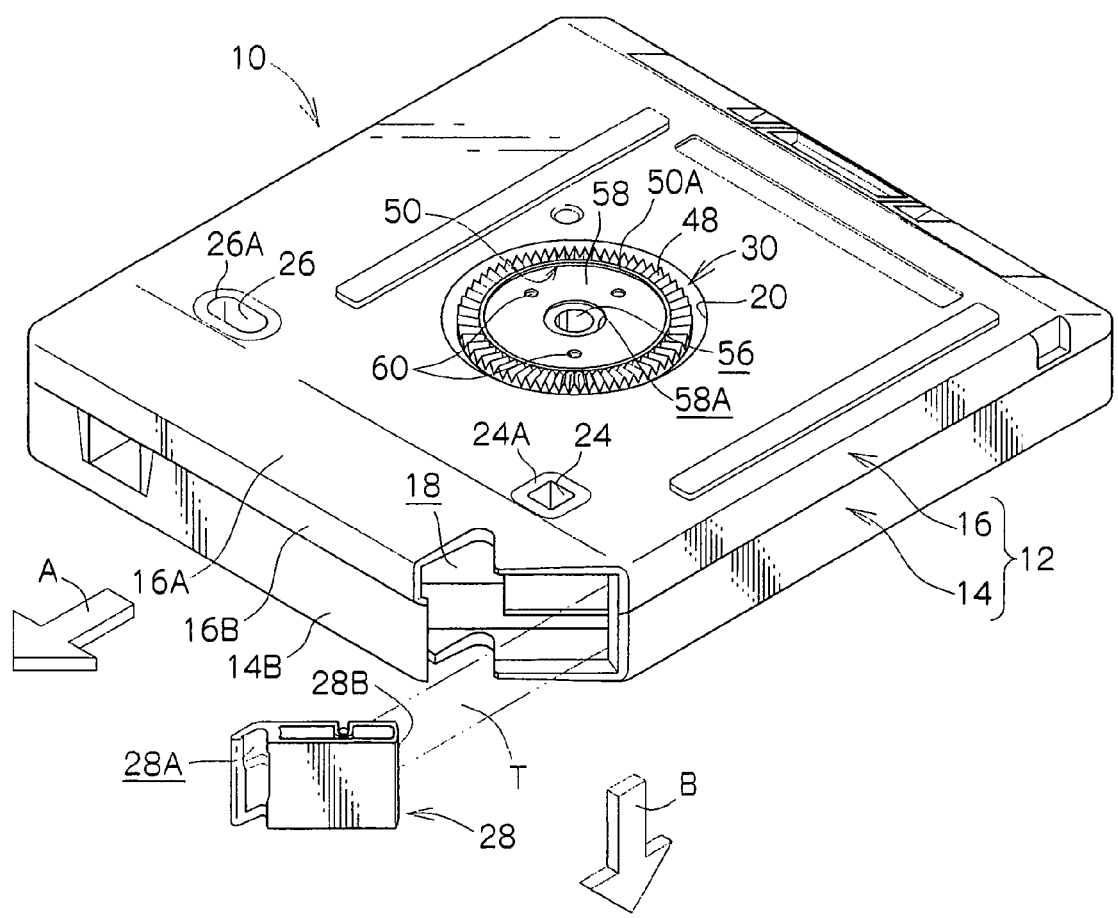
FIG. 2 is a perspective view, as seen from below, illustrating the external appearance of the recording tape cartridge relating to the embodiment of the present invention.
Figure 3:
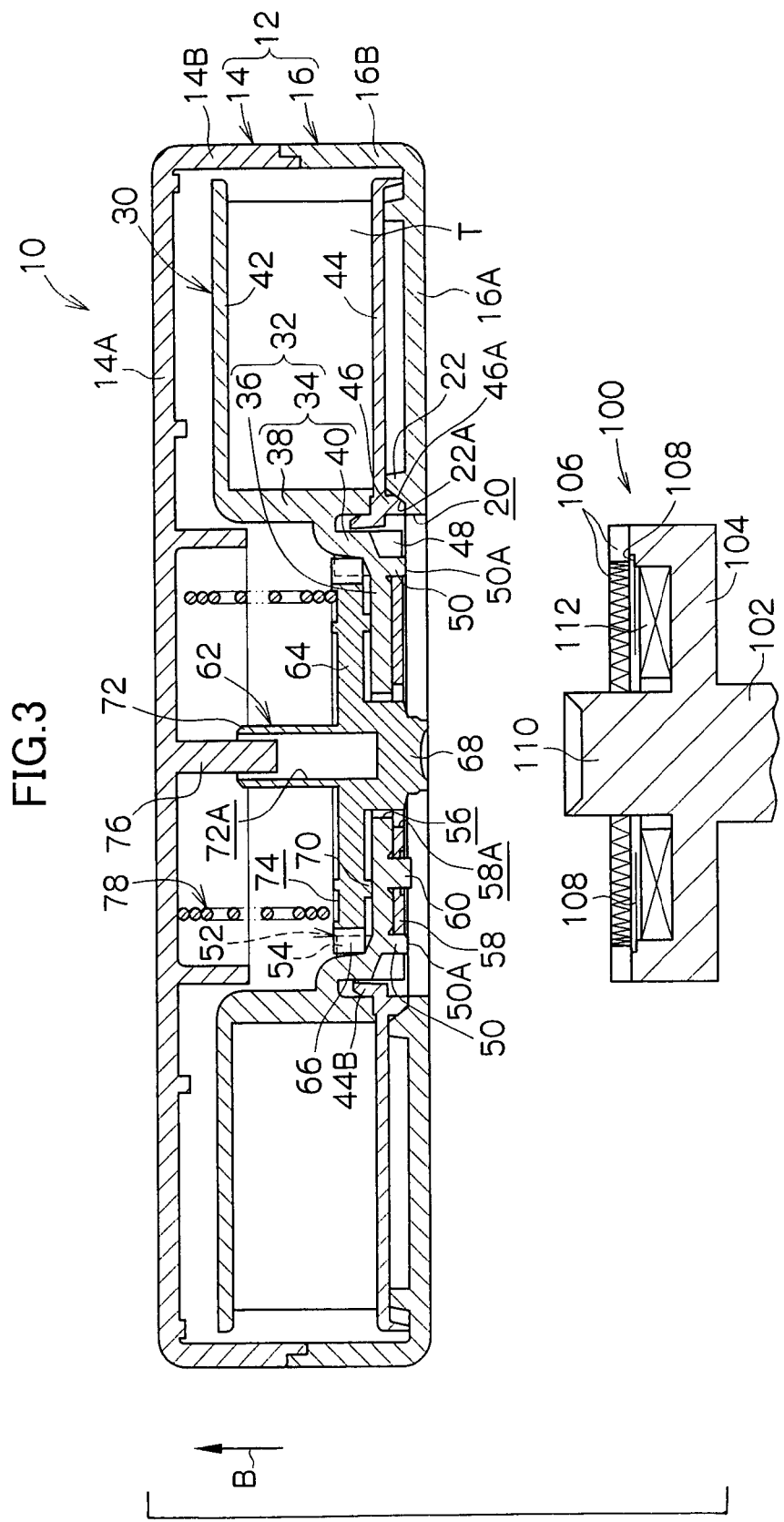
FIG. 3 is a sectional view of the recording tape cartridge relating to the embodiment of the present invention at a time when the recording tape cartridge is not in use.
Figure 4:
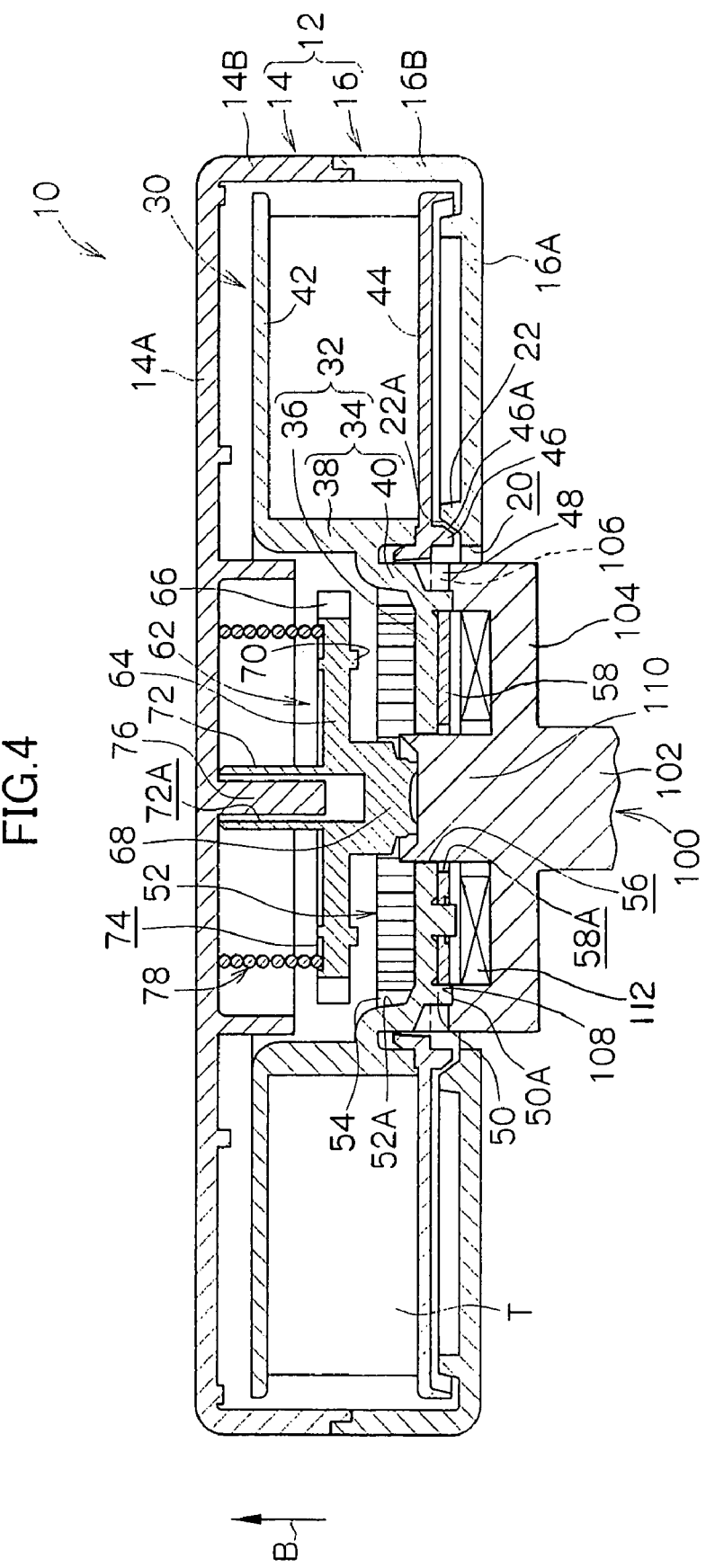
FIG. 4 is a sectional view at a time when a reel of the recording tape cartridge relating to the embodiment of the present invention is driven to rotate.

A perspective view, as seen from above and at an incline, of the recording tape cartridge 10 is shown in FIG. 1. A perspective view, as seen from below and at an incline, of the recording tape cartridge 10 is shown in FIG. 2. Sectional views of the recording tape cartridge 10 are shown in FIGS. 3 and 4.

As shown in these drawings, the recording tape cartridge 10 has a case 12. The case 12 is structured by an upper case 14 and a lower case 16 being joined together. Specifically, the upper case 14 is structured such that a substantially frame-shaped peripheral wall 14B stands erect along the outer edge of a ceiling plate 14A which is substantially rectangular in plan view. The lower case 16 is structured such that a peripheral wall 16B stands erect along the outer edge of a floor plate 16A which has a configuration substantially corresponding to that of the ceiling plate 14A. The case 12 is formed in a substantial box shape by the upper case 14 and the lower case 16 being joined together by ultrasonic welding or screws or the like in a state in which the open end of the peripheral wall 14B and the open end of the peripheral wall 16B abut one another.

As shown in FIGS. 1 and 2, at a corner portion of the case 12 at the leading side in the direction of loading the recording tape cartridge 10 into a drive device, the ceiling plate 14A, the peripheral wall 14B, the floor plate 16A and the peripheral wall 16B are respectively cut away, such that an opening 18, which is inclined with respect to the loading direction, is formed. As shown in FIGS. 2 and 3, a gear opening 20, which is circular and passes through the floor plate 16A, is formed in the substantially central portion of the floor plate 16A. The gear opening 20 is for exposing a reel gear 48 and the like which will be described later. An annular rib 22 projects toward the inner side of the case 12 at the floor plate 16A and slightly at the outer side of the gear opening 20, and is for positioning a reel 30 which will be described later. The inner peripheral surface of the annular rib 22 is a taper surface 22A whose inner diameter widens continuously from the lower portion to the upper portion thereof.

Moreover, as shown in FIG. 2, a pair of positioning holes 24, 26 are formed in a vicinity of the front end of the outer surface of the floor plate 16A of the case 12. The pair of positioning holes 24, 26 are formed in the shapes of bags within projections (not illustrated) which stand erect from the floor plate 16A toward the interior of the case 12. The positioning holes 24, 26 are disposed so as to be separated from one another on an imaginary line which is orthogonal to the loading direction. The positioning hole 24, which is the positioning hole which is closer to the opening 18, is formed in a substantially square shape, as seen in bottom view, which circumscribes a positioning pin of a drive device. The positioning pin 26 is a long hole whose longitudinal direction runs along the aforementioned imaginary line, and whose width corresponds to the diameter of a positioning pin.

In this way, when the recording tape cartridge 10 is loaded into a drive device and positioning pins are inserted into the respective positioning holes 24, 26, the recording tape cartridge 10 is correctly positioned in the horizontal directions (the left/right direction and the front/back direction) within the drive device.

The portions of the floor plate 16A around the positioning holes 24, 26 are positioning surfaces 24A, 26A which are finished so as to be smoother than the other portions of the floor plate 16A (the design surface of the floor plate 16A). When the positioning pins are inserted into the positioning holes 24, 26, the positioning surfaces 24A, 26A abut positioning surfaces of the drive device which are provided around the positioning pins. In this way, the vertical direction positioning of the recording tape cartridge 10 within the drive device is carried out.

As shown in FIG. 3, the reel 30, which will be described in detail later, is rotatably accommodated within the above-described case 12. Only one reel 30 is provided. A magnetic tape T serving as a recording tape is wound on the reel 30. A leader block 28, which serves as a pull-out member, is attached to the distal end of the magnetic tape T.

When the recording tape cartridge 10 is not being used, the leader block 28 is accommodated and held at the inner side of the opening 18 of the case 12. In this state, the leader block 28 closes the opening 18, and impedes entry of dust and the like into the case 12. An engaging recess 28A is formed in the distal end of the leader block 28. When the magnetic tape T is to be pulled-out within the drive device, a pull-out means, which engages with the engaging recess 28A, pulls the leader block 28 out of the case 12 and guides the leader block 28 to a take-up reel of the drive device. Moreover, the end surface of the leader block 28 at the side opposite the engaging recess 28A is an arc-shaped surface 28B. The arc-shaped surface 28B is fit into the take-up reel and forms a portion of the take-up surface around which the magnetic tape T is taken-up.

(Structure of Reel and the Like)

Next, the reel 30 will be described. As shown in FIGS. 3 and 4, the reel 30 has a reel hub 32 which serves as a hub and which structures the axially central portion of the reel 30. The reel hub 32 is formed substantially in the shape of a hollow cylinder having a bottom, and has a cylindrical portion 34 around which the magnetic tape T is wound, and a floor plate portion 36 which closes the bottom portion of the cylindrical portion 34. In the present embodiment, the bottom portion of the cylindrical portion 34 is a double cylinder structure.

Figure 5:
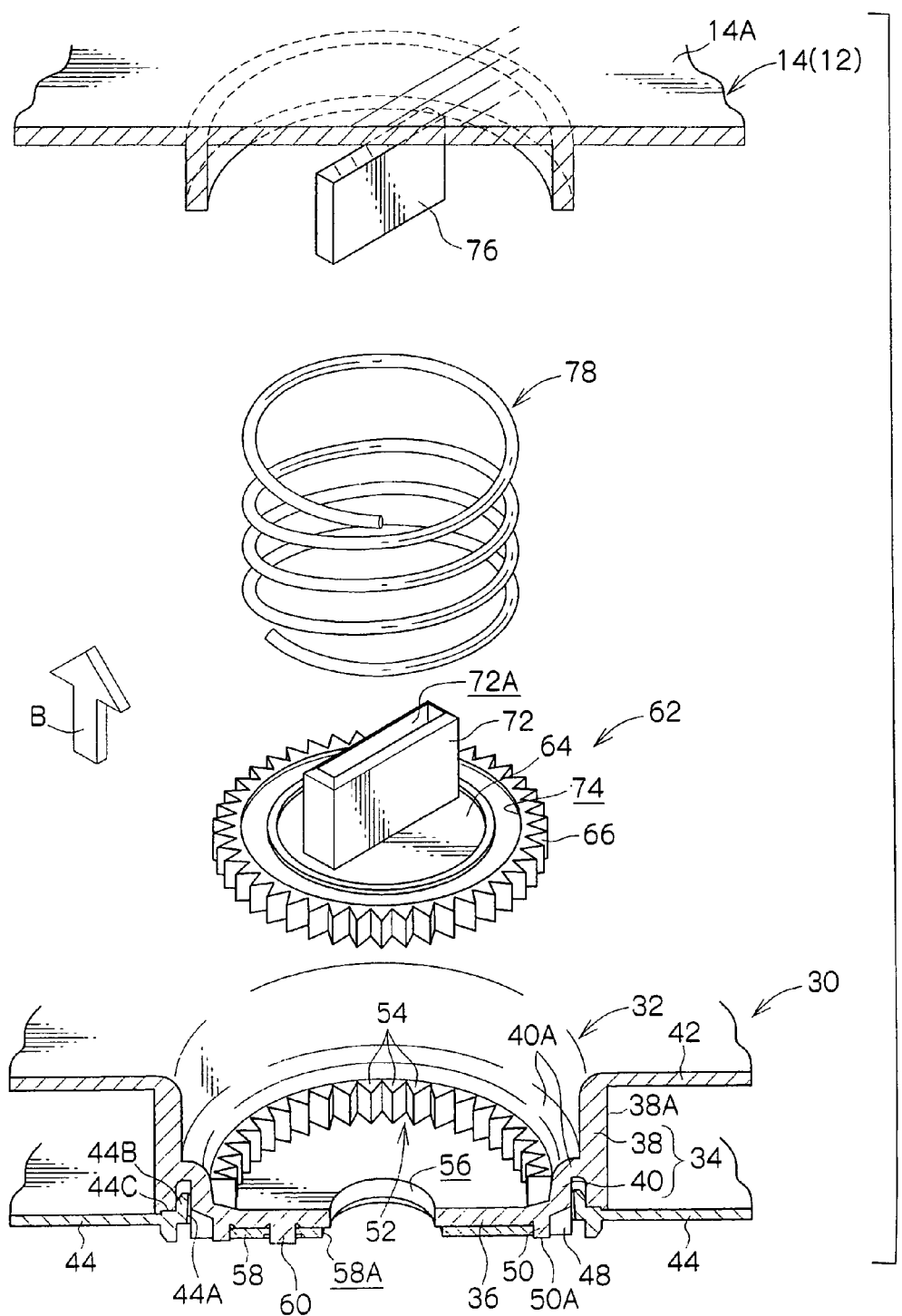
FIG. 5 is an exploded perspective view, a portion of which is cut away, showing a braking mechanism structuring the recording tape cartridge relating to the embodiment of the present invention.
Figure 6:
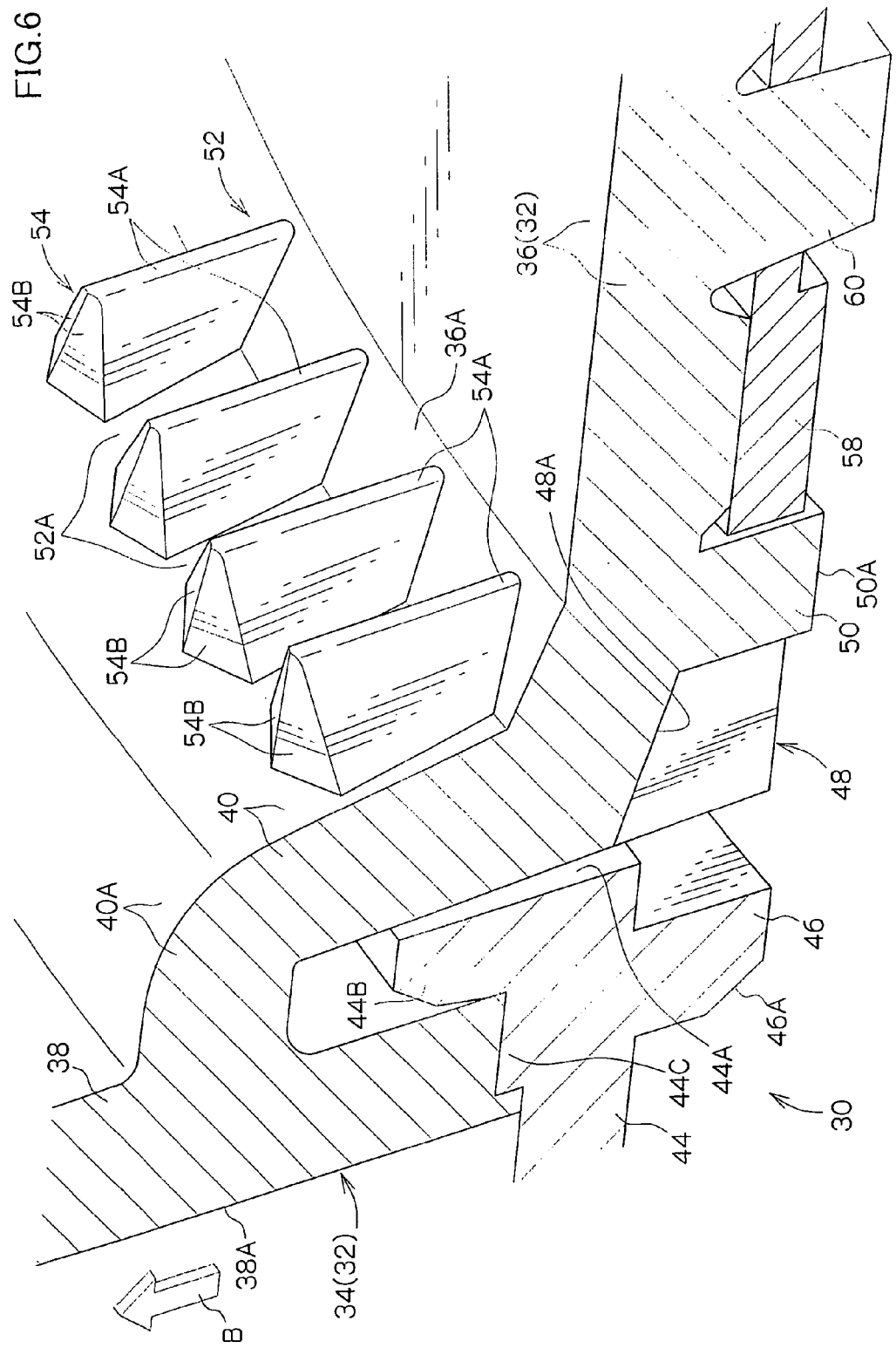
FIG. 6 is a cut diagram showing, in an enlarged manner, main portions of the reel structuring the recording tape cartridge relating to the embodiment of the present invention.

Specifically, as shown in FIGS. 5 and 6 as well, the cylindrical portion 34 is structured to have an outer cylindrical portion 38, which has an outer peripheral surface 38A around which the magnetic tape T is wound, and an inner cylindrical portion 40, whose outer diameter is smaller than the inner diameter of the outer cylindrical portion 38 and which is positioned at the inner side of the bottom portion of the outer cylindrical portion 38. A connecting ring portion 40A, which is connected to the inner peripheral surface of the lower portion of the outer cylindrical portion 38, extends outwardly in the radial direction from the top end portion of the inner cylindrical portion 40. In this way, a gap is formed between the outer cylindrical portion 38 and the inner cylindrical portion 40 which are coaxial to one another.

The outer diameter of the inner cylindrical portion 40, except for the connecting ring portion 40A, is formed to be substantially constant. The further toward the bottom side of the inner cylindrical portion 40, the more the inner peripheral surface thereof is slightly inclined with respect to the axial direction such that the inner diameter decreases. The floor plate portion 36, which has a predetermined thickness, is provided at the lower end portion (the thick portion) of the region of the inner cylindrical portion 40 where the height substantially coincides with the bottom end of the outer cylindrical portion 38. Accordingly, the floor plate portion 36 is positioned so as to project further downward than the bottom end of the outer cylindrical portion 38.

An upper flange 42 extends coaxially and integrally toward the radial direction outer side from the open end (the top end) of the cylindrical portion 34 (the outer cylindrical portion 38) at the reel hub 32. By forming the upper flange 42 integrally at the open end side, the reel hub 32 is a structure having high strength (rigidity) with respect to the winding of the magnetic tape T therearound and the like.

On the other hand, a lower flange 44, which is formed in correspondence with the upper flange 42, is joined, by ultrasonic welding or the like, to the bottom end portion of the cylindrical portion 34. Specifically, a through hole 44A, through which the inner cylindrical portion 40 can be inserted, is formed in the axially central portion of the lower flange 44. A short cylindrical portion 44B stands upward from the edge of the through hole 44A. A fusing portion 44C, which projects slightly more than the flange surface, is formed in an annular format the lower flange 44 at the radial direction outer side of the short cylindrical portion 44B. The fusing portion 44C, which abuts the bottom end surface of the outer cylindrical portion 38, is fused to the outer cylindrical portion 38 in a state in which the short cylindrical portion 44B is fit together at the inner side of the outer cylindrical portion 38 and the lower flange 44 is centered with respect to the reel hub 32.

In this way, at the reel 30, the magnetic tape T is wound around the outer peripheral surface 38A of the outer cylindrical portion 38 which structures the cylindrical portion 34 of the reel hub 32, between the opposing surfaces of the lower flange 44 and the upper flange 42. The magnetic tape T is wound around the reel hub 32 so as to be closer to either the lower flange 44 or the upper flange 42. However, in the present embodiment, the magnetic tape T is closer to the upper flange 42 (although this is not illustrated). Namely, an opposing surface (bottom surface) 42A of the upper flange 42 which opposes the lower flange 44 is the surface which the magnetic tape T abuts.

An annular rib 46 projects from the lower flange 44 at the reverse surface (the bottom surface) of the fusing portion 44C. The annular rib 46 is set so as to be slightly higher than the annular rib 22 of the case 12. The outer peripheral surface of the lower portion of the annular rib 46 is a taper surface 46A which corresponds to the taper surface 22A of the annular rib 22. Centering of the reel 30 with respect to the case 12 when the recording tape cartridge 10 is not in use is carried out by the taper surface 46A fitting together with or being set close to the taper surface 22A in a state in which the bottom end surface of the annular rib 46 abuts the floor plate 16A around the gear opening 20.

Moreover, a reel gear 48, which is formed in the shape of a ring which is substantially coaxial with the reel hub 32, projects downward from the bottom surface (the outer surface) of the floor plate portion 36 of the reel hub 32. The lower end portion of the reel gear 48 is formed as the addenda, whereas the upper end portion thereof is formed as the teeth bottoms, such that the reel gear 48 is a crown gear. This teeth bottom surface is a conical surface 48A (see FIGS. 6 and 7) around the axial center of the reel 30, which is a first conical surface having an imaginary vertex at the lower side. The radial direction outer end of the reel gear 48 (i.e., respective one end portions, in the widthwise directions of the teeth, of the respective teeth structuring the reel gear 48) substantially coincides with the outer peripheral surface of the inner cylindrical portion 40. The widths of the respective teeth forming the reel gear 48 substantially coincide with the thickness of the bottom end of the inner cylindrical portion 40. The reel gear 48 is able to mesh with a driving gear 106 provided at the distal end of a rotating shaft 100 (which will be described later) of a drive device.

A reference convex portion 50, whose bottom end surface is a reference surface 50A, projects from the bottom surface of the floor plate portion 36 at the inner side of the reel gear 48. The reference convex portion 50 is formed in the shape of a ring which is coaxial with the reel 30, and is formed so as to be integrally continuous with the radial direction inner end of the reel gear 48. Namely, the end portions of the respective teeth, which end portions are end portions in the widthwise directions of the teeth and which are at the inner side in the radial direction, are connected by the reference convex portion 50, and the respective teeth grooves are open downwardly and toward the radial direction outer side. Further, the outer diameter of the reference convex portion 50 substantially coincides with the inner diameter of the bottom end portion of the inner cylindrical portion 40.

Axial direction positioning of the reel 30 with respect to the drive device is carried out due to the reference surface 50A of the reference convex portion 50 abutting a positioning surface 108 of the rotating shaft 100. In the present embodiment, the reference surface 50A is designed as a surface which is orthogonal to the axis of the reel 30.

An engaging gear 52 is provided at the interior of the reel hub 32. A braking gear 66 of a braking member 62, which will be described later, can mesh with the engaging gear 52. The engaging gear 52 is an internal spur gear at which the inner peripheral surface of the inner cylindrical portion 40 is a tooth bottom surface 52A, and a plurality (60 in the present embodiment) of teeth 54 are formed so as to be disposed at uniform intervals along the entire circumference of the inner cylindrical portion 40. As shown in FIG. 6, the widthwise directions and the surfaces of each of the teeth 54 are substantially parallel to the axial direction of the reel 30 (the up-down direction). Addenda 54A of the respective teeth 54 are directed toward the axis of the reel 30.

As shown in FIG. 6, the top end portions of the respective teeth 54 structuring the engaging gear 52, i.e., one end portions in the widthwise directions of the teeth, are free ends, and taper surfaces 54B, which are formed so as to be symmetrical with respect to a central line in the direction of thickness of the tooth 54, are formed thereat. The taper surfaces 54B are for guiding-in the braking gear 66 which moves in, directed downward, along the axial direction of the reel 30.

Figure 7:
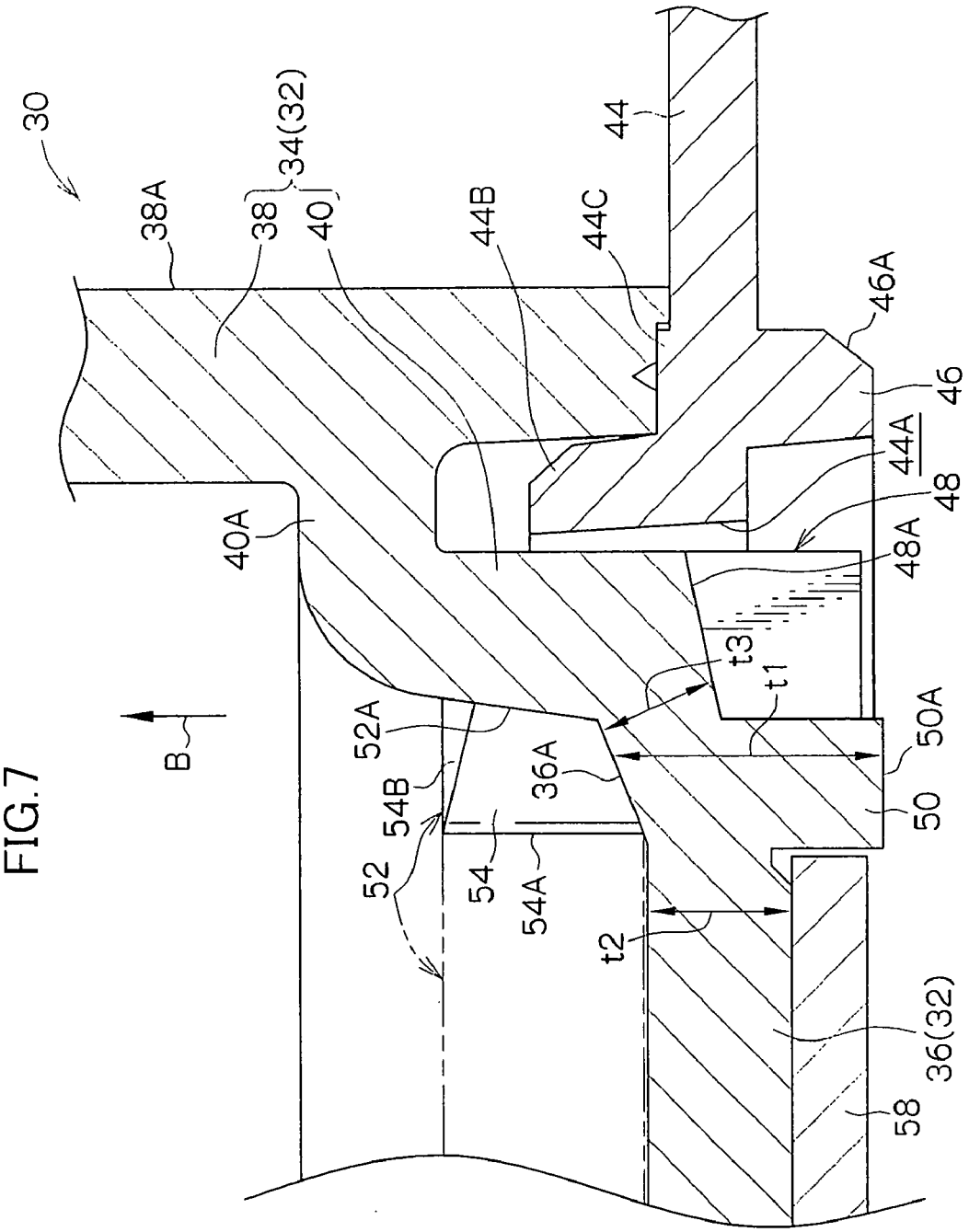
FIG. 7 is a sectional view showing, in an enlarged manner, main portions of the reel structuring the recording tape cartridge relating to the embodiment of the present invention.

On the other hand, the bottom end portions of the respective teeth 54 structuring the engaging gear 52, i.e., the other end portions in the widthwise directions of the teeth, are formed to be integrally continuous with the top surface of the floor plate portion 36. Specifically, as shown in FIGS. 6 and 7 as well, the portion of the top surface of the floor plate portion 36, which portion is at the reverse side of the reference convex portion 50, is a conical surface 36A around the axis of the reel 30 which is a second conical surface having an imaginary vertex at the lower side. The bottom end portions of the respective teeth 54 are continuous with the conical surface 36A. The inner and outer diameters of the conical surface 36A substantially coincide with the inner and outer diameters of the reference convex portion 50 (see FIG. 7). Further, the respective addenda 54A of the teeth 54 are positioned slightly further toward the radial direction outer side than the inner edge of the conical surface 36A.

Accordingly, the reference convex portion 50 is structured so as to project from the floor plate portion 36 at the opposite side of the region where the engaging gear 52 is formed to project. Moreover, as shown in FIG. 7, the angle of intersection of the generatrices of the conical surfaces 36A, 48A is small (the generatrices are nearly parallel), and the conical surface 36A overlaps the conical surface 48A in a direction orthogonal to the generatrix of the conical surface 36A (the direction of thickness t3 which will be described later). Accordingly, viewed from another perspective, the following interpretation is possible: the reel hub 32 is structured such that the corner portion between the inner cylindrical portion 40 and the floor plate portion 36 is conical at both the inner surface and the outer surface, and such that the engaging gear 52 projects directly upward from the top surface of the outer peripheral portion of the floor plate portion 36 (i.e., from the conical surface 36A) which outer peripheral portion is formed in a substantially conical shape (more precisely, in a shape of an annular portion of a cone), and such that the reel gear 48 projects directly downward from the bottom surface of that conical outer peripheral portion (i.e., from the conical surface 48A).

Further, as shown in FIGS. 3 and 5, a pass-through hole 56 is formed in the floor plate portion 36 of the reel hub 32 so as to pass through the axially central portion of the floor plate portion 36 along the direction of plate thickness (the axial direction). The pass-through hole 56 is a circular hole, and is for operation of a releasing projection 68 (to be described later) of the braking member 62 from the exterior. A convex portion 110, which is provided at the rotating shaft 100 and pushes and operates the releasing projection 68, can fit in the pass-through hole 56 so as to be slidable along the axial direction. Centering of the reel 30 with respect to the rotating shaft 100 is carried out thereby. The axial direction length of the surface of the pass-through hole 56 which fits together with the convex portion 110 (i.e., the inner peripheral surface of the pass-through hole 56) is 1 mm to 3 mm (and preferably, 2 mm to 3 mm).

The portions of the above-described reel 30, other than the lower flange 44, are formed integrally by resin molding. A reel plate 58, which is formed of a magnetic material and which is disc-shaped and in which a hole is formed, is attached coaxially to the bottom surface of the floor plate portion 36 at the inner side of the reference convex portion 50. The outer diameter of the reel plate 58 is slightly smaller than the inner diameter of the reference convex portion 50. The inner diameter of a through hole 58A formed in the axially central portion of the reel plate 58 is slightly larger than the inner diameter of the pass-through hole 56. The reel plate 58 is fixedly attached to the reel hub 32 by the caulking of caulking projections 60, which project from the bottom surface of the floor plate portion 36, in a state in which the caulking projections 60 are inserted through three attachment holes 58B disposed at uniform intervals in the peripheral direction of the reel plate 58. Note that the reel plate 58 may be fixed to the reel 30 by insert molding.

The reel plate 58 is attracted and held by a magnet 112 of the rotating shaft 100 in a state in which the reel plate 58 and the magnet 112 do not contact one another. At this time, the convex portion 110 of the rotating shaft 100 is inserted through the through hole 58A. However, the inner edge of the reel plate 58 does not interfere with the convex portion 110 of the rotating shaft, because the through hole 58A has a smaller diameter than that of the pass-through hole 56.

The reel 30 is accommodated in the case 12, and when the recording tape cartridge 10 is not in use, the annular rib 46 is positioned in the annular rib 22 of the case 12. Specifically, as described above, while the bottom end surface of the annular rib 46 abuts the surface of the floor plate 16A around the gear opening 20, the taper surface 46A of the annular rib 46 fits together with or is set close to the taper surface 22A of the annular rib 22, such that joggling (mainly, movement in the radial direction) of the reel 30 with respect to the case 12 is restricted.

In this positioned state, the reel 30 is positioned within the case 12 on the whole, and the reel gear 48, the pass-through hole 56, the reference surface 50A of the reference convex portion 50, and the reel plate 58 are exposed from the gear opening 20 (see FIG. 2). Namely, the reel gear 48 faces the exterior of the case 12 from the gear opening 20, without projecting out from the outer surface (the bottom surface) of the floor plate 16A. In this way, operation, i.e., chucking (holding) and driving/rotating, of the reel 30 from the exterior of the case 12 is possible.

At the above-described reel 30, the reel hub 32 and the upper and lower flanges 42, 44 are formed of a material in which carbon fibers (hereinafter abbreviated as "CF") are added in an amount of 5% by volume to 15% by volume to polycarbonate (hereinafter abbreviated as "PC") which is a resin material. The CF are manufactured by using polyacrylonitrile (PAN) or pitch as the raw material, such that the fiber diameter is in a range of 3 μm to 20 μm, and the average fiber length (the average fiber length is the fiber length of a particle per unit volume (1 mm$^3$) in a pellet state) is in a range of 100 μm to 500 μm. In the present embodiment, CF manufactured by using PAN as the raw material are used.

CF existing at the appropriate density at the respective surfaces of the reel hub 32 and the upper and lower flanges 42, 44 raises the electrical conductivity (lowers the surface electrical resistance). Therefore, molding is carried out with, as a molding condition, the mold temperature at the product surface being a constant temperature from 65° C. to 100° C. (80° C. in the present embodiment). By adding CF to the PC, the surface electrical resistance can be controlled to be in the range of $10^5$ Ω/mm$^2$ to $10^{12}$ Ω/mm$^2$ at the flange surfaces of the upper and lower flanges 42, 44 (in a case in which the applied voltage is 500 V).

Moreover, by adding CF to the PC, as the mechanical strength, a strength within the range of 137 MPa to 197 MPa (1400 kg/cm$^2$ to 2000 kg/cm$^2$) can be ensured as the bending strength. Specifically, when using a material in which CF (pellets), whose fiber diameter was 7 μm and whose fiber length was in the range of 200 μm to 300 μm, were used and these CF were added to PC in an amount of 8% by volume, a bending strength of substantially 161 MPa was obtained as actual results. Further, with the material in which the aforementioned CF was mixed into PC in the aforementioned proportion, a surface electrical resistance of $10^7$ Ω/mm$^2$ was obtained as actual results. Moreover, the specific gravity of this material was 1.24, and the bending modulus of elasticity thereof was 6200 MPa. This bending modulus of elasticity is preferably 5000 MPa or more. Detailed description will be given hereinafter.

Figure 8:
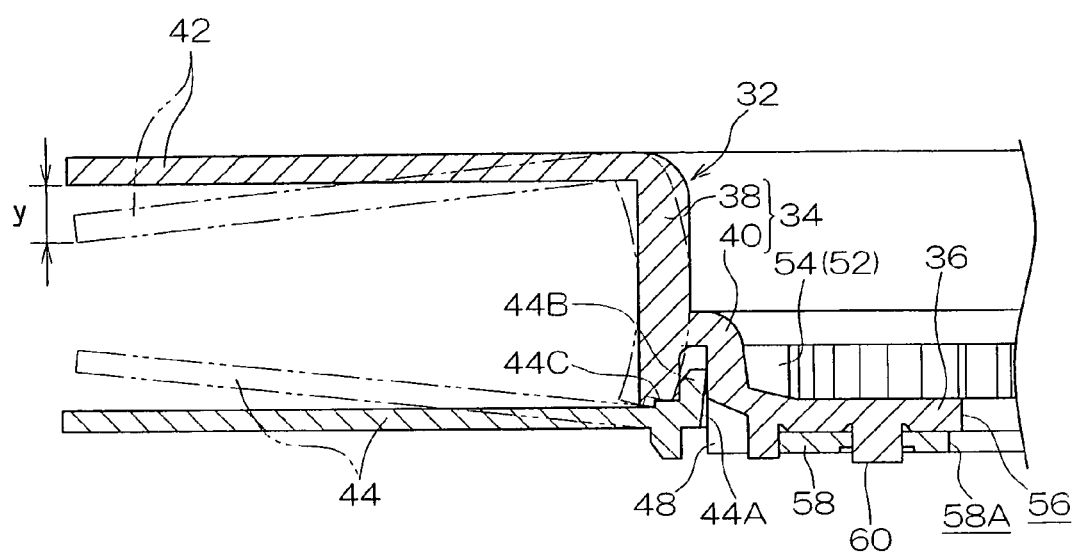
FIG. 8 is a sectional view showing a deformed state of the reel structuring the recording tape cartridge relating to the embodiment of the present invention.

When the bending modulus of elasticity of the material forming the reel 30 is low, the reel hub 32 contracts due to the internal pressure based on the tension of the magnetic tape T wound around the reel hub 32 (the outer cylindrical portion 38). This amount of contraction is generally greater at the central portion of the reel hub 32 (the outer cylindrical portion 38) than at the axial direction end portions thereof. However, there are cases in which, depending on the state of the magnetic tape T, the axial direction end portions of the reel hub 32 deform (contract) more. In a case in which the bending modulus of elasticity is low and the reel hub 32 deforms easily, as shown in FIG. 8, there are cases in which, accompanying the deformation of the end portions of the reel hub 32, the upper flange 42 and the lower flange 44 (which hereinafter may upon occasion be called "the upper flange 42 and the like") collapse toward the magnetic tape T. When the upper flange 42 and the like collapse toward the magnetic tape T, the upper flange 42 contacts the edge of the magnetic tape T and is a cause of damaging the edge of the tape. In particular, if the tapered amount (a taper in which the outer peripheral side is thinner than the inner peripheral side) of the upper flange 42 and the like is small, it is easy for the edge of the magnetic tape T to be contacted to the aforementioned collapsing. Note that, in FIG. 8, the deformation of the respective portions is illustrated in an exaggerated manner.

Here, results of actually measuring displacement y, in the vertical direction (the direction along the axis), of the outermost peripheral portion of the upper flange 42 and the like toward the magnetic tape T will be described, in a case in which the tape inner pressure (the inner pressure applied to the reel hub 32 by the tension of the magnetic tape T) was 0.8 MPa, the outer diameters of the upper and lower flanges 42, 44 were 101 mm, the outer diameter of the reel hub 32 (the outer cylindrical portion 38) was 48 mm, the thickness of the outer cylindrical portion 38 was 2.7 mm, and the height of the outer cylindrical portion 38 (between the upper and lower flanges 42, 44) was 12.75 mm. At the reel 30 formed of a material in which the aforementioned CF was added to PC in an amount of 8% by volume and whose bending modulus of elasticity was 6200 MPa, the displacement y was in the range of substantially 10 μm to 40 μm. On the other hand, at the reel 30 formed of a material in which neither CF nor glass fibers (GF) were added and whose bending modulus of elasticity was 2400 MPa, the displacement y was in the range of substantially 80 μm to 150 μm. Accordingly, comparing the cases in which CF were not added and CF were added, the results that the displacement y differed by 2.0 times or more and 15 times or less were obtained. Namely, by raising the bending modulus of elasticity by adding CF to PC, deformation of the upper flange 42 and the lower flange 44 can be suppressed.

From the allowable values of the displacement y, the bending modulus of elasticity of the material forming the reel 30 is preferably 5000 MPa or more as described above. The bending modulus of elasticity is increased by increasing the amount of the CF added to the PC. However, when the amount of CF which is added is increased, costs rise, local dimensional errors arise due to the anisotropy of the CF, and the flowability at the time of molding deteriorates. Therefore, as described above, the added amount of CF is preferably 15% by volume or less, and more preferably 10% by volume or less. Further, the thickness of the reel hub 32 (the outer cylindrical portion 38) is preferably 2.0 mm or more, and more preferably 2.5 mm or more. In the present embodiment, in the same way as the structure relating to the above-described experiment, the thickness of the outer cylindrical portion 38 is 2.7 mm.

Further, in order to improve the strength of the reel hub 32 with respect to the magnetic tape T being wound therearound, i.e., in order to improve the bending modulus of elasticity even more, a talc material (a tabular filler) may be added, together with the CF, to the PC. The addition of the talc material is also effective in improving the mold releasability of the material (the reel 30).

In addition, in order to improve the flame retardance of the reel hub 32, fluorine (F) may be used as a flame retardant. In the present embodiment, fluorine is added in an amount of 1% by mass with respect to the PC, to the aforementioned material in which CF are added to PC. The mold releasability of the material (the reel 30) also improves due to the addition of fluorine.

(Structure of Braking Member)

As shown in FIGS. 3 through 5, the recording tape cartridge 10 is equipped with the braking member 62 which impedes rotation of the reel 30 with respect to the case 12 when the recording tape cartridge 10 is not in use. The braking member 62 has, at the outer peripheral portion of a main body portion 64 which is substantially disc-shaped, the braking gear 66 which can mesh with the engaging gear 52.

The braking gear 66 is an external spur gear whose pitch circle coincides with the pitch circle of the engaging gear 52, and at which a plurality (60 in the present embodiment) of teeth are disposed at uniform intervals along the entire periphery of the main body portion 64. The widthwise directions of the respective teeth are substantially parallel to the axial direction of the main body portion 64. Accordingly, all of the teeth of the braking gear 66, which are of the same number as the number of the teeth of the engaging gear 52, mesh with the engaging gear 52.

Moreover, as shown in FIGS. 3 and 4, the releasing projection 68 projects from the axially central portion of the bottom surface of the main body portion 64. The releasing projection 68 is formed substantially in the shape of a solid cylinder whose outer diameter is smaller than the inner diameter of the pass-through hole 56 of the reel 30. Further, a stopper convex portion 70 serving as a stopper projects from the radial direction intermediate portion of the bottom surface of the main body portion 64. The stopper convex portion 70 is formed in an annular form. The height by which the stopper convex portion 70 projects from the main body portion 64 is slightly greater than the axial direction height of the conical surface 36A of the reel 30.

On the other hand, an engaging projection 72 projects from the top surface of the main body portion 64. An engaging groove 72A is provided in the engaging projection 72. The engaging groove 72A is formed to be rectangular as seen in plan view, and the center thereof coincides with the axial center of the main body portion 64. Further, a spring receiving concave portion 74, which is surrounded by a wall portion which is annular as seen in plan view, is formed at the top surface of the main body portion 64 at the outer side of the engaging projection 72.

The above-described braking member 62 is formed on the whole integrally by resin molding. The braking member 62 is inserted in and disposed within the cylindrical portion 34 of the reel hub 32 substantially coaxially and so as to be movable in the vertical direction (the axial direction of the reel 30). In this way, due to the braking member 62 moving in the vertical direction, the braking member 62 is able to selectively be positioned at a rotation locking position (see FIG. 3) at which the braking gear 66 thereof meshes with the engaging gear 52 provided at the reel hub 32, and a released position (see FIG. 4) at which this meshing is released.

The braking member 62 which is positioned at the rotation locking position makes the bottom end surface of the stopper convex portion 70 abut the top surface of the floor plate portion 36 of the reel 30. In this way, when the braking member 62 is positioned at the rotation locking position, the braking gear 66 does not interfere with the conical surface 36A of the reel 30. Further, the releasing projection 68 of the braking member 62, which is positioned at the rotation locking position, passes through the pass-through hole 56 of the reel 30 and the through hole 58A, and is exposed so as to be able to be operated from the exterior. The dimensions are determined such that, in this state, the bottom end surface of the releasing projection 68 does not project further than the bottom surface of the floor plate 16A of the case 12.

An engaging piece 76, which projects downward from the ceiling plate 14A of the case 12, is disposed in the engaging groove 72A of the engaging projection 72 of the braking member 62. The engaging piece 76 is formed so as to be shaped as a rectangle (shaped as a detent) as seen in bottom view, in correspondence with the engaging groove 72A. Due to the engaging piece 76 being disposed in the engaging groove 72A, rotation of the braking member 62 with respect to the case 12 is impeded while sliding of the braking member 62 in the axial (vertical) direction is permitted. In this way, while the braking member 62 is guided by the engaging piece 76, the braking member 62 can move along the axial direction of the reel 30 between the rotation locking position and the released position. Further, in the state in which the braking member 62 is positioned at the rotation locking position at which the braking gear 66 thereof is meshed with the engaging gear 52 of the reel hub 32, the braking member 62 impedes rotation of the reel 30.

Moreover, a compression coil spring 78 which is an urging member is disposed in a compressed state between the spring receiving concave portion 74 of the braking member 62 and the ceiling plate 14A of the case 12. The compression coil spring 78 urges the braking member 62 downward due to the urging force of the compression coil spring 78. In this way, the braking member 62 is usually positioned at the rotation locking position, so as to prevent inadvertent rotation of the reel 30 when the magnetic tape T is not being used.

Further, due to the urging force of the compression coil spring 78, the reel 30, at which the top surface of the floor plate portion 36 is abutting the bottom end surface of the stopper convex portion 70, also is urged downward. In this way, as described above, the annular rib 46 abuts the floor plate 16A, the taper surface 46A is fit together with or is set close to the taper surface 22A, and the reel 30 does not joggle within the case 12.

On the other hand, when the releasing projection 68 is pushed upward against the urging force of the compression coil spring 78, the braking member 62 moves to the released position. Specifically, as shown in FIG. 4, due to the operations of the recording tape cartridge 10 being loaded into a drive device and the reel 30 being chucked by the rotating shaft 100 of the drive device, the braking member 62 moves to the released position and releases the locked state of the reel 30.

First, the rotating shaft 100 will be described. The rotating shaft 100 is structured such that the driving gear 106, which can mesh with the reel gear of the reel 30, is formed at the outer peripheral portion of the top surface of a rotating table 104 which is disc-shaped and provided at the distal end of a rotating shaft portion 102. The portion of the top surface of the rotating table 104 at the radial direction inner side of the driving gear 106 is the positioning surface 108 which the reference surface 50A of the reel 30 abuts. The positioning surface 108 is a flat surface which runs along a plane orthogonal to the axis of the rotating shaft 100. The convex portion 110, which can enter into and fit-together with the pass-through hole 56 of the reel 30, projects from the axially central portion of the top surface of the rotating table 104. The convex portion 110 is formed to be a height such that, while pushing the releasing projection 68 of the braking member 62, the convex portion 110 enters into the pass-through hole 56 and can move the braking member 62 to the released position. The magnet 112 is attached to the top surface of the rotating table 104 between the convex portion 110 and the positioning surface 108. The magnet 112 attracts and holds the reel plate 58 of the reel 30 in a state in which the magnet 112 and the reel plate 58 do not contact one another.

When the releasing projection 68 is pushed by the convex portion 110 and the braking member 62 is pushed up to the released position as the reel gear 48 of the reel 30 meshes with the driving gear 106 of the rotating shaft 100, the meshing of the engaging gear 52 and the braking gear 66 is released. In this way, the reel 30 becomes able to rotate with respect to the case 12.

Further, accompanying this operation, due to the convex portion 110 fitting-together with the fit-together surface of the pass-through hole 56, the reel 30 is centered with respect to the rotating shaft 100. Due to the positioning surface 108 of the rotating shaft 100 abutting the reference surface 50A, the reel 30 is positioned in the axial direction. Note that, in this state in which the reel 30 is positioned in the axial direction, slight backlash arises between the reel gear 48 and the driving gear 106, and the positioning due to the abutment of the reference surface 50A and the positioning surface 108 is not disturbed by the meshing together of the reel gear 48 and the driving gear 106.

In the state in which centering with respect to the rotating shaft 100 and axial direction positioning have been carried out, the reel plate 58 of the reel 30 is attracted and held by the magnet 112 in a non-contacting state, and the reel 30 rises up within the case 12 so as to move away from the floor plate 16A and the annular rib 22. In this way, as shown in FIG. 4, the reel 30 becomes able to rotate around the axis in a state of not contacting the case 12.

Next, operation of the present embodiment will be described.

At the recording tape cartridge 10 having the above-described structure, when the magnetic tape T is not in use, the reel 30 is pushed against the floor plate 16A by the urging force of the compression coil spring 78, such that the reel gear 48, the pass-through hole 56, the reference surface 50A, and the reel plate 58 are respectively exposed from the gear opening 20. Due to the urging force of the compression coil spring 78, the braking member 62 is positioned at the rotation locking position, the braking gear 66 thereof is meshed with the engaging gear 52 of the reel 30, and rotation of the reel 30 with respect to the case 12 is impeded. Further, the opening 18 is closed by the leader block 28.

On the other hand, when the magnetic tape T is to be used, the recording tape cartridge 10 is loaded into a bucket (not illustrated) of a drive device. When the recording tape cartridge 10 is loaded into the bucket, the bucket is lowered, and the rotating shaft 100 of the drive device relatively approaches the case 12 from below (moves upward with respect to the case 12). Thus, the convex portion 110 of the rotating shaft 100 enters into the pass-through hole 56 of the reel 30 and fits-together therewith, while pressing the releasing projection 68 of the braking member 62. In this way, the braking member 62 is pushed upward against the urging force of the compression coil spring 78 (moves to the released position relative to the reel 30), such that the state in which rotation of the reel 30 is locked by the braking member 62 is released.

When the rotating shaft 100 moves further upward, the driving gear 106 meshes with the reel gear 48. When the positioning surface 108 of the rotating shaft 100 abuts the reference surface 50A of the reel 30, the rotating shaft 100 moves further upward together with the reel 30 and the braking member 62. Then, when the bucket is lowered by a set stroke and stops, movement of the rotating shaft 100 with respect to the case 12 stops. The reference surface 50A of the reel 30 abuts the positioning surface 108, and the reel 30 is positioned at a rotatable position at which it is raised up within the case 12 (see FIG. 4).

In this state, the braking member 62, whose releasing projection 68 is abutting the convex portion 110, is held at the released position (the released position with respect to the case 12). Further, due to the convex portion 110 fitting-together with the pass-through hole 56 as described above, the reel 30 is centered with respect to the rotating shaft 100. In this state, due to the attraction force by which the magnet 112 attracts the reel plate 58, the reel 30 is held by the rotating shaft 100.

Moreover, due to the bucket, i.e., the recording tape cartridge 10, being lowered within the drive device, the positioning pins of the drive device respectively enter into the positioning holes 24, 26 of the case 12, and the positioning surfaces of the drive device abut the positioning surfaces 24A, 26A of the case 12. The case 12 is thereby positioned in the horizontal directions and in the vertical direction with respect to the drive device.

Thus, while a pull-out pin (not illustrated) of the pull-out means of the drive device engages with the engaging recess 28A of the leader block 28, the pull-out means pulls the leader block 28 out from the case 12 and guides it to the take-up reel of the drive device. The leader block 28 is fit into the take-up reel such that the arc-shaped surface 28B structures a portion of the take-up surface around which the magnetic tape T is taken-up. In this state, when the leader block 28 rotates integrally with the take-up reel, the magnetic tape T is pulled-out from the case 12 through the opening 18 while being taken-up onto the reel hub of the take-up reel.

At this time, the reel 30 of the recording tape cartridge 10 rotates synchronously with the tape-up reel, due to the torque of the rotating shaft 100 which is transmitted by the driving gear 106 which meshes with the reel gear 48. Information is recorded onto the magnetic tape T or information recorded on the magnetic tape T is played back by a recording/playback head disposed along a predetermined tape path of the drive device.

On the other hand, when the magnetic tape T is rewound onto the reel 30 and the leader block 28 is held at a predetermined position within the case 12 in a vicinity of the opening 18, the drive device raises the bucket in which the recording tape cartridge 10 is loaded. Thus, the meshed-together state of the reel gear 48 and the driving gear 106 is cancelled, the convex portion 110 withdraws from the pass-through hole 56, the abutment of the releasing projection 68 and the convex portion 110 is cancelled, and the braking member 62 is returned, by the urging force of the compression coil spring 78, to the rotation locking position at which the braking gear 66 meshes with the engaging gear 52. Moreover, due to the urging force of the compression coil spring 78, the reel 30 also moves downward and returns to its initial state at which the reel gear 48 and the like are exposed from the gear opening 20. In this state, the recording tape cartridge 10 is discharged from the bucket.

Here, the engaging gear 52 of the reel 30 is an internal spur gear at which the teeth surfaces of the respective teeth 54 are substantially parallel to the axis of the reel 30. Further, the braking gear 66 of the braking member 62 is an external spur gear which corresponds to the engaging gear 52. Therefore, the backlash in the peripheral direction between the braking gear 66 and the engaging gear 52 does not change due to axial direction movement of the braking member 62. Accordingly, even if the position of the braking member 62 becomes offset from the rotation locking position toward the released position within the range of the width of the teeth, inadvertent rotation of the reel 30 is impeded. Moreover, even if an attempt is made to forcibly rotate the reel 30 which is in the rotation locked state, none of this torque is converted, by the meshed-together surfaces of the braking gear 66 and the engaging gear 52, into moving force for moving the braking member toward the released position, and inadvertent rotation of the reel 30 is reliably impeded.

In this way, in the recording tape cartridge 10 relating to the present embodiment, it is difficult for meshing of the braking gear 66 of the braking member 62 and the engaging gear 52 of the reel 30 to be cancelled inadvertently.

Moreover, although the reference convex portion 50 projects from the region of the floor plate portion 36 of the reel hub 32 which region is at the reverse surface side of the region where the engaging gear 52 projects (i.e., the conical surface 36A), the engaging gear 52 is an internal spur gear. Therefore, the tooth groove portion of the engaging gear 52 prevents the region including the reference convex portion 50 at the floor plate portion 36 from becoming thick. Namely, as compared with the thickness from the bottom end of the rib 212 to the top end of the pedestal portion 210 in the conventional reel 200 having the pedestal portion 210, it is possible to make the thickness t1 (see FIG. 7) from the reference surface 50A to the conical surface 36A small. In this way, the moldability in a case in which the reel 30 is formed by resin molding is improved, and the reference surface 50A can be formed with high precision. Note that the resin material forming the reel 30 will be described later.

In addition, the reel gear 48 and the engaging gear 52 project or stand erect directly from the floor plate portion 36 of the reel hub 32. Therefore, no portions whose thicknesses vary in the form of steps as in the conventional art is formed at the floor plate portion 36 due to the provision of the reel gear 48 and the engaging gear 52. Further, in the present embodiment, the conical surface 36A, which is the proximal end of the engaging gear 52 at the inner surface of the floor plate portion 36, is inclined toward the same side as the conical surface 48A which is the proximal end of the reel gear 48 at the outer surface of the floor plate portion 36, and the conical surface 36A overlaps the conical surface 48A in a direction orthogonal to the generatrix of the conical surface 36A. Therefore, the thicknesses of the floor plate portion 36 at the regions where the engaging gear 52 and the reel gear 48 are formed to project are made to be substantially uniform, without varying in a stepwise manner. Namely, as shown in FIG. 7, a thickness t2 of the floor plate portion 36 at the inner side of the reference convex portion 50, and a thickness t3 of the portion where the conical surface 36A overlaps the conical surface 48A in the direction orthogonal to the generatrix of the conical surface 36A, are made to be substantially uniform. Therefore, the flowability of resin within a mold used for resin molding the reel 30 is good, and the moldability of the reel 30 is improved further.

As described above, it is possible to realize a preferable structure in which the reel gear 48, the engaging gear 52, and the reference convex portion 50 are disposed as far as possible toward the outer peripheral side of the floor plate portion 36, without sacrificing the resin moldability. Namely, due to the reel gear 48, to which rotational torque of the reel 30 is transmitted from the driving gear 106, having a large diameter, the stress applied to each tooth is mitigated. Further, due to the engaging gear 52, which impedes rotation of the reel 30 by meshing with the braking gear of the braking member 62, having a large diameter, the stress applied to each tooth 54 at the time when braking torque is applied is mitigated. Moreover, due to the reference convex portion 50, which carries out axial direction positioning of the reel 30 by the reference surface 50A abutting the positioning surface 108, having a large diameter, the effects of errors in the precision (flatness) of the reference surface 50A on the accuracy of positioning are mitigated.

Due to one end portion, in the widthwise directions of the teeth, of the reel gear 48 coinciding with the outer peripheral surface of the floor plate portion 36, the reel gear 48 can be made to have a maximum diameter, within the range of the constraint of being provided at the bottom surface of the floor plate portion 36 (i.e., of meshing with the driving gear 106 which enters into the gear opening 20 of the case 12). Further, by making the inner peripheral surface of the inner cylindrical portion 40 be the tooth bottom surface 52A, the engaging gear 52 can be made to have a maximum diameter, within the range of the constraint of being provided within the inner cylindrical portion 40. In addition, because the engaging gear 52 is an internal gear, the braking gear of the braking member 62 can be made to be an external gear, and the braking member 62, which has the simple structure in which the braking gear 66 is merely provided at the outer peripheral portion of the disc-shaped main body portion 64, is realized. Further, by making the outer peripheral surface of the reference convex portion 50 continuous with the radial direction inner end of the reel gear 48, the reference convex portion 50 can be made to have a maximum diameter, within the range of the constraint that the reel gear 48 is made to have a maximum diameter.

In this way, by providing the recording tape cartridge 10 relating to the present embodiment with the engaging gear 52 which is an internal spur gear, a structure provided with the reference surface 50A, which assists in the positioning of the reel 30 in the axial direction by abutting the positioning surface 108 of the drive device, can be improved.

Here, because the reference convex portion 50 is formed in an annular form and is a structure having a closed cross-section as seen in bottom view, the rigidity thereof is high. Further, because the reference convex portion 50 is formed to be continuous with the reel gear 48, the respective teeth of the reel gear 48 also function as reinforcing ribs which reinforce the reference convex portion 50, and the rigidity of the reference convex portion 50 is improved. When the rigidity of the reference convex portion 50 is high, at the time when the reference surface 50A abuts the positioning surface 108, there is little deformation of the reference convex portion 50, and the accuracy of positioning the reel 30 in the axial direction within the drive device is high.

Because the engaging gear 52 is formed in an annular form in which the plurality of teeth 54 are provided along the entire circumference at uniform intervals, even if the braking gear 66 is a structure having teeth which are provided discretely in the peripheral direction, regardless of the rotational position of the reel 30, the engaging gear 52 reliably meshes with the braking gear 66 and rotation of the reel 30 can be impeded. Because the braking gear 66 and the engaging gear 52 are structured to have the same number of teeth, when braking torque is applied to the braking gear 66 and the engaging gear 52 which are meshed together, the braking torque is dispersed among the respective teeth, which are meshing together, of the braking gear 66 and the engaging gear 52, and the stress applied to each tooth is mitigated. Further, the stress applied to each tooth of the braking gear 66 and the engaging gear 52 is also mitigated by making the diameter of the engaging gear 52 be a maximum as described above. Moreover, because one end portion, in the widthwise directions of the teeth, of the engaging gear 52 is formed continuously with the floor plate portion 36 (the conical surface 36A), the rigidity of each of the teeth 54 is high. In this way, for example, the tooth thickness of each of the teeth 54 forming the engaging gear 52 can be made to be small, and the tooth width of each of the teeth 54 can be made to be large. Namely, there are fewer design constraints on the provision of the engaging gear 52, and the degrees of freedom in the designing of the reel 30 are increased.

The reference surface 50A of the reference convex portion 50 projects further downward than the addenda of the reel gear 48. In other words, at the radial direction inner end portion of the reel gear 48, the end portions, in the widthwise directions of the teeth, of the respective teeth are continuous with the outer peripheral surface of the reference convex portion 50 along the entire circumference. Therefore, the strength of the reel gear 48 (and of the addenda in particular) is high, and it is difficult for the reel gear 48 to break.

An end portion, in the widthwise direction of the tooth, of each of the teeth 54 is the taper surfaces 54B. Therefore, while the above-described feature of the teeth surfaces being substantially parallel to the axis of the reel 30 is realized, the braking gear 66 of the braking member 62, which moves from the released position to the rotation locking position, can be reliably guided in. Namely, merely due to downward moving force being applied to the braking member 62 by the compression coil spring 78, the taper surfaces 54B reliably guide the respective teeth of the braking gear 66 into the teeth grooves of the engaging gear 52.

The braking member 62 has the stopper convex portion 70 which projects downward from the main body portion 64. Therefore, when the braking member 62 is positioned at the rotation locking position, the braking gear 66 is held at the proper position of meshing with the engaging gear 52, without interfering with the conical surface 36A of the reel 30. Further, the position, in the axial direction of the reel 30, at which the braking gear 66 and the engaging gear 52 mesh together, can be set in accordance with the height of the stopper convex portion 70, and the degrees of freedom in design can be increased.

Figure 9:
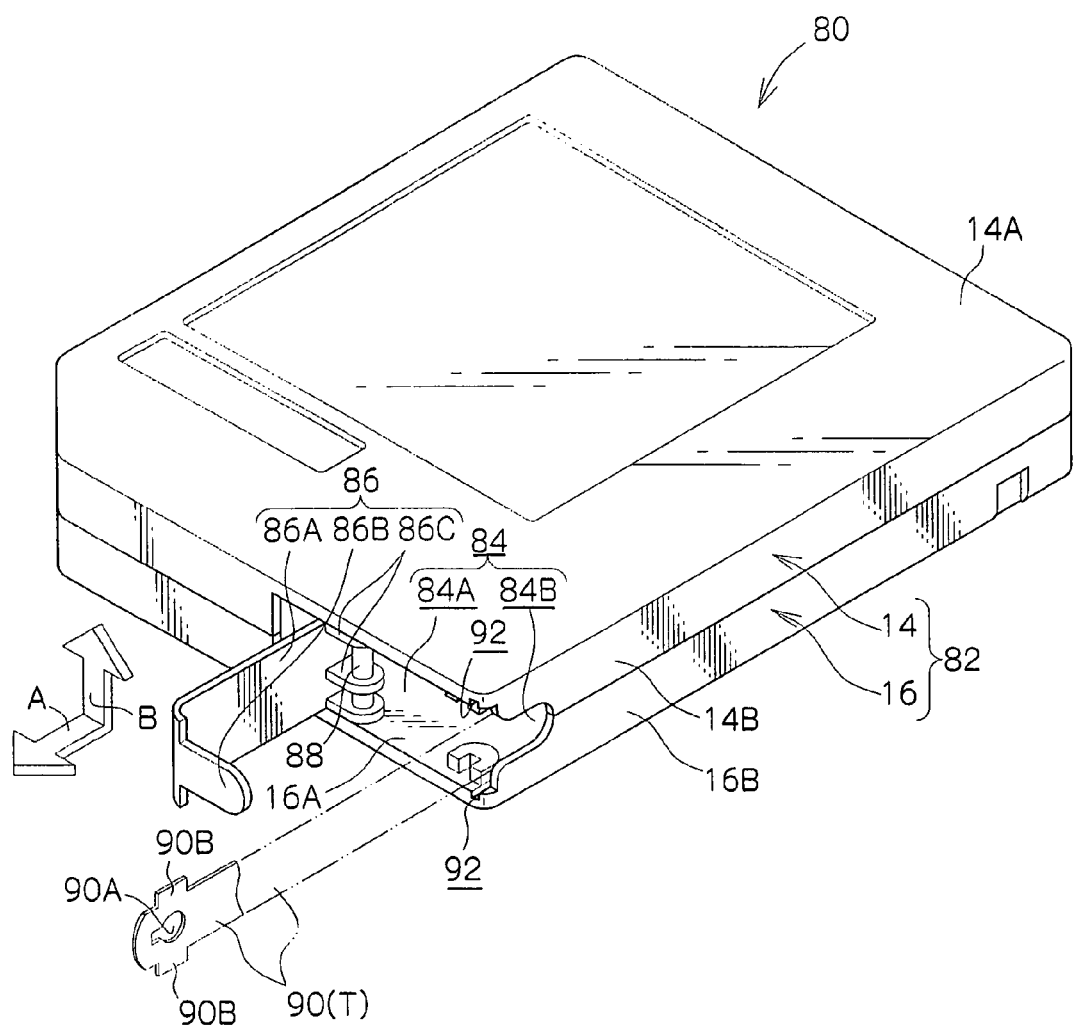
FIG. 9 is a perspective view, as seen from above, showing the external appearance of a recording tape cartridge relating to a modified example of the embodiment of the present invention.
Figure 10:
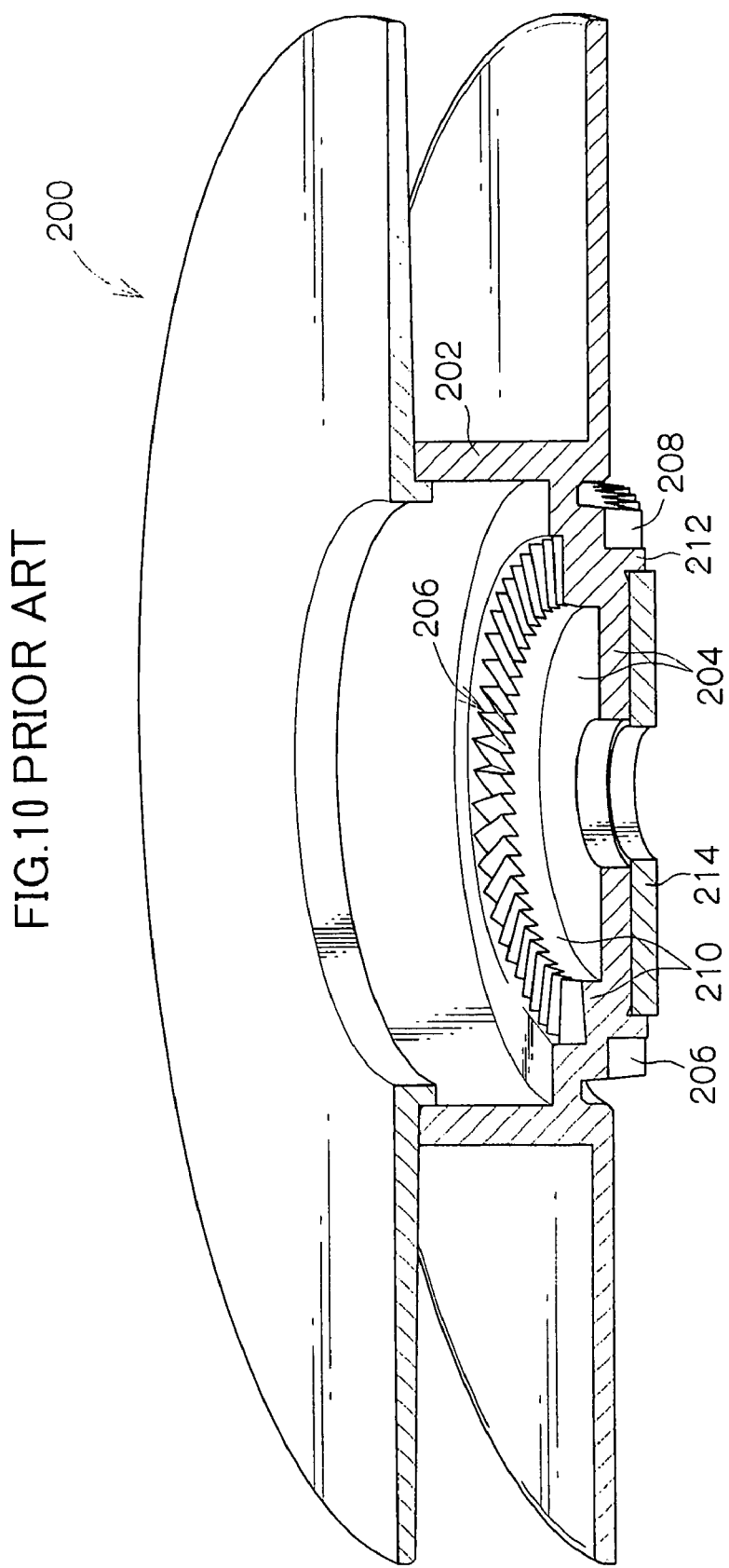
FIG. 10 is a cut diagram showing a reel structuring a conventional recording tape cartridge.
Figure 11:
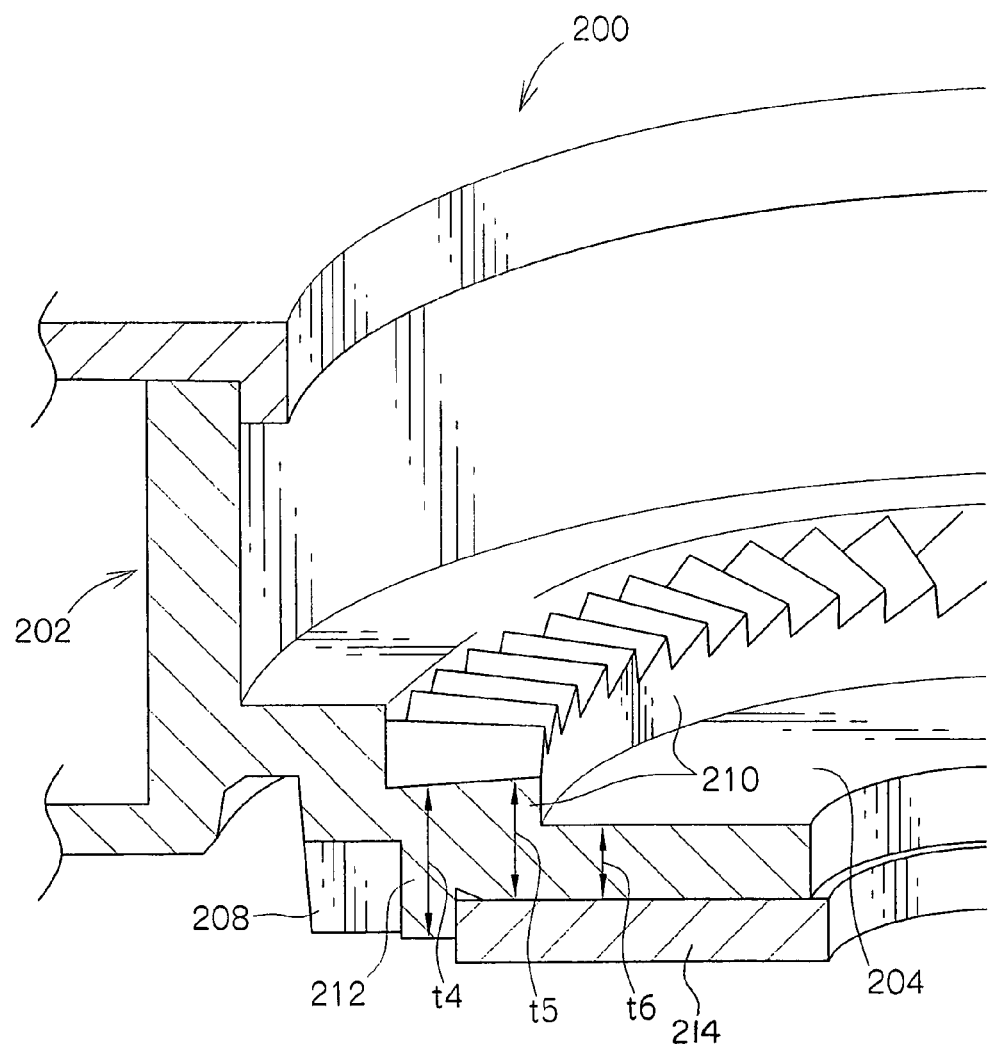
FIG. 11 is a cut diagram showing, in an enlarged manner, a portion of the reel structuring the conventional recording tape cartridge.

In the above-described embodiment, as an example, a structure is described in which the recording tape cartridge 10 has the leader block 28 which is attached to the distal end of the magnetic tape T and opens and closes the opening 18. However, the present invention is not to be limited by any of the structure of the case 12 including the opening 18, the structure of the closing member which closes the opening 18, the structure of the leader member attached to the distal end of the magnetic tape T, or the like. Accordingly, for example, the present invention may be applied to a recording tape cartridge 80 relating to a modified example and illustrated in FIG. 9. Hereinafter, the recording tape cartridge 80 will be described. However, parts and portions which are basically the same as those of the above-described embodiment are denoted by the same reference numerals as in the above-described embodiment, and description thereof is omitted.

The recording tape cartridge 80 has, in place of the case 12, a case 82. The case 82 has, in place of the opening 18, an opening 84. The opening 84 is provided at the side of the case 82 in the direction of loading the recording tape cartridge 80 into a drive device, at the corner portion at the opposite side of the corner portion at which the opening 18 is provided. Accordingly, at the recording tape cartridge 80, the direction in which the magnetic tape T is wound onto the reel 30 is opposite to the direction of winding at the recording tape cartridge 10. The opening 84 is structured by a tape opening 82A and a chuck opening 84B being provided so as to be continuous with one another. The tape opening 82A is formed by cutting off a portion of the front wall of the case 82 over substantially the entire height thereof. The chuck opening 84B is formed by cutting off the vertical direction intermediate portion of a portion of a side wall of the case 12.

The opening 84 is opened and closed by a door member 86. The door member 86 is structured so as to have a main body portion 86A, which is shaped as a flat plate and which can close the tape opening 82A, and an extended portion 86B, which extends from one end portion of the main body portion 86A in a direction orthogonal thereto and which can close the chuck opening 84B. Shaft receiving portions 86C are formed integrally in the vicinity of the other end portion of the main body portion 86A. The shaft receiving portions 86C are supported so as to be able to rotate around a supporting shaft 88 which is provided within the case 82 in a vicinity of the edge of the tape opening 82A. In this way, due to the door member 86 rotating around the supporting shaft 88, the door member 86 can be selectively disposed at a closing position, at which the door member 86 closes the opening 84, and an opening position, at which the door member 86 opens the opening 84.

The door member 86 is urged in the direction of closing the opening 84 by an unillustrated torsion spring which is disposed around the supporting shaft 88. Accordingly, at the recording tape cartridge 80, usually, the opening 84 is closed by the door member 86. On the other hand, due to the operation of the recording tape cartridge 80 being loaded into a drive device, the portion of the door member 86 which is further toward the other end side than the shaft receiving portions 86C (i.e., the portion of the door member 86 at the side opposite the extended portion 86B) is pushed by a pushing portion of the drive device, and rotates against the urging force of the torsion spring due to the moment applied thereto, so as to open the opening 84.

In the recording tape cartridge 80, a leader tape 90 is attached to the distal end of the magnetic tape T in place of the leader block 28. The leader tape 90 is formed of a resin material such as polyethylene terephthalate (PET) or the like for example, and is structured to be stronger than the magnetic tape T. The leader tape 90 has the same width as that of the magnetic tape T, and can be taken-up onto the reel 30 and the take-up reel of the drive device. A chuck hole 90A is formed in a vicinity of the distal end of the leader tape 90. When the magnetic tape T is pulled-out from the case 82, the chuck hole 90A is caught by a catching portion of a pull-out means of the drive device.

Anchor pieces 90B, which jut out from the transverse (vertical) direction both ends, are provided in a vicinity of the distal end of the leader tape 90. The anchor pieces 90B can be attached to and detached from anchor grooves 92 which are provided at the ceiling plate 14A and the floor plate 16A of the case 82 respectively, and which run along the chuck opening 84B. When the recording tape cartridge 80 is not in use, the anchor pieces 90B of the leader tape 90 are disposed in the anchor grooves 92, and due to the rear edge portions of the anchor pieces 90B engaging with the groove edges of the anchor grooves 92, further winding of the leader tape 90 onto the reel 30 is impeded. In this state, the distal end of the leader tape 90 does not interfere with the door member 86 (the main body portion 86A) which closes the opening 84.

On the other hand, in the state in which the opening 84 is open, the chuck hole 90A of the leader tape 90 is exposed from the chuck opening 84B, and can be caught by the catching portion of the pull-out means. The leader tape 90, whose chuck hole 90A has been caught by the catching portion, is guided to the take-up reel by the pull-out means, and is taken-up onto the take-up reel and structures the take-up surface of the magnetic tape T.

The other structures and operations of the recording tape cartridge 80 are the same as the corresponding structures and operations of the recording tape cartridge 10. Accordingly, the reel 30 and the braking member 62, which are the main portions of the present invention, are applied to the recording tape cartridge 80 relating to the present modified example, and the exact same effects as those of the recording tape cartridge 10 relating to the above-described embodiment can be achieved. Further, although the recording tape cartridge 80 has been described as a modified example, it goes without saying that the present invention can be applied to any recording tape cartridge, such as, for example, a structure in which the opening of the case is opened and closed by a sliding door, or the like.

In the above-described embodiment and modified example, the engaging gear 52 of the reel is an internal spur gear in which the inner peripheral surface of the inner cylindrical portion 40 is the teeth bottom surfaces. However, the present invention is not limited to the same. Various modifications are possible such as, for example, the engaging gear 52 may be an external gear, or the engaging gear 52 may be formed in the form of internal teeth or external teeth by teeth which are provided discretely in the peripheral direction (a group of teeth), or the engaging gear 52 may be a structure not having teeth bottom surfaces (in this case, the engaging gear 52 may be interpreted as being inner teeth or as being outer teeth), or the engaging gear 52 may be formed as a member separate from the reel 30 and attached to the interior of the reel hub 32, or, in the above structure, one end portion of the engaging gear 52, in the widthwise directions of the teeth, may be set apart from the floor plate portion 36, or the engaging gear 52 may be disposed toward the axial center of the reel hub 32 (formed along a circumference having a smaller diameter), or the directions of the tooth traces of the respective teeth 54 may be inclined with respect to the axial direction of the reel 30. Further, the engaging gear 52 is not limited to the structure having the taper surfaces 54B for guiding-in the braking gear 66. For example, in place of the both taper surfaces at each tooth, a single taper surface may be provided. Or, the engaging gear 52 may be structured so as to not have a portion for guiding-in the braking gear 66, and such a portion may be provided at the braking gear 66.

In the above-described embodiment and modified example, the braking gear 66 of the braking member 62 is structured to have the same number of teeth as the engaging gear 52. However, the present invention is not limited to the same, and various modifications are possible. For example, in a structure in which the engaging gear 52 is structured such that the teeth 54 are disposed at uniform intervals along the entire circumference, the braking gear 66 may be structured such that teeth are provided discretely in the peripheral direction. Or, in a case in which the engaging gear 52 is formed in the form of external teeth (including a case in which the engaging gear 52 does not have the teeth bottom surfaces), the braking gear 66 may be formed in the form of internal teeth. In addition, in the above-described embodiment and modified example, the stopper convex portion 70 projects from the main body portion 64 of the braking member 62. However, the present invention is not limited to the same. For example, the stopper convex portion 70 may be provided so as to project from the top surface of the floor plate portion 36 of the reel 30. Or, by providing the braking gear 66 to be offset upwardly with respect to the main body portion 64, the main body portion 64 can be made to function as a stopper.

In the above-described embodiment and modified example, the reference for the axial direction positioning of the reel 30 with respect to the rotating shaft 100 (the drive device) is the reference surface 50A of the reference convex portion 50. However, the present invention is not limited to the same. For example, the positioning of the reel 30 with respect to the rotating shaft 100 (the centering and the positioning in the axial direction) may be carried out by the meshing of the reel gear 48 and the driving gear 106. Moreover, in a structure in which the axial direction positioning of the reel 30 with respect to the rotating shaft 100 (the drive device) is carried out at the reference surface 50A, the reference surface 50A is not limited to a structure which is a surface orthogonal to the axial direction. For example, the reference surface 50A and the positioning surface 108 of the rotating shaft 100 may be tapered surfaces which correspond to one another. In such cases, for example, centering of the reel 30 with respect to the rotating shaft 100 does not have to be carried out by the convex portion 110 of the rotating shaft 100 fitting together with the pass-through hole 56 of the reel 30. Moreover, the reference convex portion 50 is not limited to being formed in an annular form, and, for example, may be structured by plural portions which are disposed at uniform intervals in the peripheral direction. In addition, the reference convex portion 50 may be provided independently of the reel gear 48, or may be disposed at the radial direction outer side of the reel gear 48, or the reference surface 50A may be disposed further upward than the addenda of the reel gear 48.

In the above-described embodiment and modified example, the teeth bottom surfaces of the reel gear 48 (the region where the reel gear 48 projects from the floor plate portion 36) is the conical surface 48A. However, the present invention is not limited to the same. For example, the teeth bottom surface of the reel gear 48 may be a surface which is orthogonal to the axis of the reel 30 (i.e., a horizontal surface), or may be a conical surface which is inclined toward the side opposite the conical surface 48A, with respect to that horizontal surface. In these cases, it suffices to set the region where the respective teeth 54 of the engaging gear 52 stand erect at the floor plate portion 36 such that the floor plate portion 36 is made to have a uniform thickness. Moreover, the reel gear 48 is provided at the outer peripheral portion of the floor plate portion 36, but can be interpreted as being provided at the bottom end portion of the cylindrical portion 34. In addition, the reel gear 48 is not limited to the structure in which the radial direction outer end thereof substantially coincides with the outer peripheral surface of the cylindrical portion 34, and may be disposed further toward the axial center at the floor plate portion 36 (i.e., may be structured so as to have a smaller diameter).

In the above-described embodiment and modified example, the braking member 62 is positioned at the released position by being pushed directly by the convex portion 110 of the rotating shaft 100. However, the present invention is not limited to the same. For example, a releasing member may be interposed between the floor plate portion 36 and the main body portion 64 of the braking member 62. Further, the braking member 62 is not limited to the structure in which the releasing projection 68 is provided at the axially central portion thereof. For example, a plurality of the releasing projections 68 may be provided at uniform intervals in the peripheral direction, and one or a plurality of the pass-through holes 56, which expose the releasing projections 68 such that they can be operated, may be provided.

In the above-described embodiment and modified example, the reel 30 is structured to have the reel plate 58 which is attracted to and held by the magnet 112 of the rotating shaft 100. However, the present invention is not limited to the same, and, for example, the reel 30 may be structured so as to not have the reel plate 58. In this case, for example, the urging force of the compression coil spring 78 may be applied to the region where the reel gear 48 and the driving gear 106 mesh together.

The above-described embodiment and modified example are preferable structures in which the upper flange 42 is formed integrally with the reel hub 32. However, the present invention is not limited to the same. For example, the lower flange 44 may be formed integrally with the reel hub 32, and the upper flange 42 may be attached to the reel hub 32 by fusing. Or, both of the upper and lower flanges 42, 44 may be attached to the reel hub 32 by fusing.

In the above-described embodiment and modified example, a structure is described in which the material of the reel 30 is a material in which CF are added to PC. However, the present invention is not limited to the same, and the reel 30 may be formed of any resin material. However, as described above, it is preferable that the bending modulus of elasticity of the material forming the reel 30 having the above-described dimensions is 5000 MPa or more.

The magnetic tape T is used as the recording tape in the above-described embodiment and modified example. However, the present invention is not limited to the same. It suffices for the recording tape to be interpreted as an information recording/playback medium which is shaped as an elongated tape and on which information can be recorded and from which recorded information can be played back. It goes without saying that the recording tape cartridge relating to the present invention can be applied to recording tapes of any recording/playback systems.

As described above, the recording tape cartridge relating to the present invention has the excellent effect that, by being provided with an engaging gear in the form of internal teeth or in the form of external teeth, it is difficult for meshing of the braking gear of the braking member and the engaging gear of the reel to inadvertently be released.

Moreover, the recording tape cartridge relating to the present invention has the excellent effect that, by being provided with an engaging gear in the form of internal teeth or in the form of external teeth, the floor plate portion of the reel hub can be made to be thin or can be made to have a uniform thickness by utilizing the above-described structure.

What is claimed is:

1. A recording tape cartridge comprising:
    a reel having a reel hub provided at an axially central portion of the reel, the reel hub having a cylindrical portion around whose outer peripheral surface a recording tape is wound and a floor plate portion closing one end portion of the cylindrical portion;
    an engaging gear which is formed in one of a form of internal teeth and a form of external teeth and at which a plurality of teeth provided in the reel hub are disposed along a circumference which is coaxial to the reel hub, a tooth surface in a lengthwise direction of each of the teeth being substantially parallel to an axis of the reel hub;
    a case rotatably accommodating the reel; and
    a braking member having a braking gear which is formed in one of a form of external teeth and a form of internal teeth and which can mesh with the engaging gear, the braking member being supported so as to be unable to rotate within the case with respect to the case and so as to be movable along an axis of the reel, and, by moving, the braking member can be selectively disposed at a rotation locking position, at which the braking gear is meshed with the engaging gear, and a released position, at which meshing of the braking gear and the engaging gear is released.

2. The recording tape cartridge of claim 1, wherein the engaging gear is formed in the form of internal teeth at which an inner surface of the cylindrical portion of the reel hub is teeth bottom surfaces.

3. The recording tape cartridge of claim 1, wherein one end portion, in a widthwise direction of the tooth, of each tooth structuring the engaging gear is integral with the floor plate portion of the reel hub.

4. The recording tape cartridge of claim 1, wherein the engaging gear is formed in an annular form in which the teeth are disposed at uniform intervals in a circumferential direction along an entire periphery of the reel hub.

5. The recording tape cartridge of claim 1, wherein an end portion, in a widthwise direction of the tooth, of each tooth of the engaging gear, which end portion is at a side near the braking member, is formed in a taper shape which guides the braking gear in.

6. The recording tape cartridge of claim 1, wherein the braking gear is formed in an annular form which meshes with all of the teeth of the engaging gear.

7. The recording tape cartridge of claim 1, wherein a stopper is provided at one of the braking member and the floor plate portion of the reel hub, and the stopper abuts another of the braking member and the floor plate portion of the reel hub in a state in which the braking gear is apart from the floor plate portion of the reel hub when the braking member is positioned at the rotation locking position.

8. A recording tape cartridge comprising:
    a reel having a reel hub provided at an axially central portion of the reel, the reel hub having a cylindrical portion around whose outer peripheral surface a recording tape is wound and a floor plate portion closing one end portion of the cylindrical portion;
    an engaging gear which is formed in one of a form of internal teeth and a form of external teeth and at which a plurality of teeth standing erect from an inner surface of the floor plate portion of the reel hub are disposed on a circumference which is coaxial to the reel hub, a tooth surface in a lengthwise direction of each of the teeth being substantially parallel to an axis of the reel hub;
    a reference convex portion projecting from the floor plate portion of the reel hub at a reverse surface of a region where the engaging gear stands erect, a positioning surface of a drive device abutting an end surface of the reference convex portion;

a case rotatably accommodating the reel while exposing the reference convex portion of the reel to an exterior; and a braking member having a braking gear which is formed in one of a form of external teeth and a form of internal teeth and which can mesh with the engaging gear, the braking member being supported so as to be unable to rotate within the case with respect to the case and so as to be movable along an axis of the reel, and, by moving, the braking member can be selectively disposed at a rotation locking position, at which the braking gear is meshed with the engaging gear, and a released position, at which meshing of the braking gear and the engaging gear is released.

9. The recording tape cartridge of claim 8, wherein a first conical surface around the axis of the reel hub is formed at an outer surface of the floor plate portion of the reel hub, and an annular reel gear, with which a driving gear of a drive device can mesh, projects from the first conical surface, and a region where the engaging gear stands erect at an inner surface of the floor plate portion of the reel hub is a second conical surface which is inclined toward a same side as the first conical surface and which overlaps the first conical surface in a direction orthogonal to a direction of inclination.

10. The recording tape cartridge of claim 9, wherein the reference convex portion is integral with one of a radial direction inner end and a radial direction outer end of the reel gear.

11. The recording tape cartridge of claim 9, wherein the engaging gear is an internal gear at which an inner surface of the cylindrical portion of the reel hub is teeth bottom surfaces.

12. The recording tape cartridge of claim 9, wherein the engaging gear is formed in an annular form in which the teeth are disposed at uniform intervals in a circumferential direction along an entire periphery of the reel hub.

13. The recording tape cartridge of claim 12, wherein the reference convex portion is formed in an annular form.

14. The recording tape cartridge of claim 13, wherein an outer peripheral surface of the reference convex portion is integral with a radial direction inner end of the reel gear.

15. The recording tape cartridge of claim 9, wherein a stopper is provided at one of the braking member and the floor plate portion of the reel hub, and the stopper abuts another of the braking member and the floor plate portion of the reel hub in a state in which the braking gear is apart from the floor plate portion of the reel hub when the braking member is positioned at the rotation locking position.

16. A recording tape cartridge comprising:

a reel having a reel hub provided at an axially central portion of the reel, the reel hub having a cylindrical portion around whose outer peripheral surface a recording tape is wound and a floor plate portion closing one end portion of the cylindrical portion;

a reel gear projecting along the outer peripheral surface of the cylindrical portion of the reel hub from an outer surface of the floor plate portion of the reel hub, the reel gear being formed in an annular form and being able to mesh with a drive gear of a drive device;

an engaging gear which is an internal spur gear at which an inner surface of the cylindrical portion of the reel hub includes teeth bottom surfaces and at which one end portion, in a widthwise direction of teeth, is continuous with the floor plate portion of the reel hub;

a case rotatably accommodating the reel while exposing the reel gear to an exterior; and a braking member having a braking gear which is formed in a form of external teeth and which can mesh with the engaging gear, the braking member being supported so as to be unable to rotate within the case with respect to the case and so as to be movable along an axis of the reel, and, by moving, the braking member can be selectively disposed at a rotation locking position, at which the braking gear is meshed with the engaging gear, and a released position, at which meshing of the braking gear and the engaging gear is released.

17. The recording tape cartridge of claim 16, wherein a region at the floor plate portion of the reel hub at which region the reel gear projects is a first conical surface whose axis coincides with an axis of the reel hub, and a surface of the floor plate portion with which surface the engaging gear is continuous is a second conical surface which is inclined in a same direction as the first conical surface and whose axis coincides with the axis of the first conical surface.

18. The recording tape cartridge of claim 17, wherein an inner diameter of the reel gear is smaller than an inner diameter of the engaging gear, and a reference convex portion, whose end surface abuts a positioning surface of the drive device, projects from the floor plate portion at a reverse side of the second conical surface.

19. The recording tape cartridge of claim 18, wherein the reference convex portion is formed in an annular form, and an outer peripheral surface of the reference convex portion is integral with a radial direction inner end of the reel gear.

20. The recording tape cartridge of claim 19, wherein the end surface of the reference convex portion projects further in an axial direction of the reel hub than addenda of the reel gear.

* * * * *